(12) United States Patent
O'Donnell et al.

(10) Patent No.: US 12,447,890 B2
(45) Date of Patent: Oct. 21, 2025

(54) OVER THE HOLE TRAILER

(71) Applicant: INA Acquisition Corp., Wilmington, DE (US)

(72) Inventors: Neil O'Donnell, St. Louis, MO (US); Kurt Schlake, St. Louis, MO (US)

(73) Assignee: INA Acquisition Corp., Wilmington, DE (US)

( * ) Notice: Subject to any disclaimer, the term of this patent is extended or adjusted under 35 U.S.C. 154(b) by 422 days.

(21) Appl. No.: 18/053,982

(22) Filed: Nov. 9, 2022

(65) Prior Publication Data

US 2024/0149776 A1    May 9, 2024

(51) Int. Cl.
    *B60P 3/40* (2006.01)
    *F16L 1/06* (2006.01)

(52) U.S. Cl.
    CPC ............. *B60P 3/40* (2013.01); *F16L 1/065* (2013.01)

(58) Field of Classification Search
    CPC ...... B60P 3/40; B60P 3/34; B60P 3/42; B60P 3/14; B60P 9/00; B62D 33/08; B62D 21/14; F16L 1/065; F16L 55/165; F16L 55/18
    USPC ............ 296/171, 175, 165, 168, 173, 26.02, 296/26.13, 26.05, 24.32; 138/97, 98; 405/184.2
    See application file for complete search history.

(56) References Cited

U.S. PATENT DOCUMENTS

| | | | |
|---|---|---|---|
| 2,177,394 A | 10/1939 | Pierce | |
| 2,879,103 A | 3/1959 | Hall | |
| 3,694,024 A | 9/1972 | Linville | |
| 3,815,949 A * | 6/1974 | Ulert | B62D 33/08 52/67 |
| 4,206,943 A | 6/1980 | Friedenberg | |
| 4,270,791 A * | 6/1981 | Tann | B62D 33/08 52/204.597 |
| 4,358,133 A | 11/1982 | Stucky | |
| 4,685,983 A * | 8/1987 | Long, Jr. | F16L 55/1651 264/510 |
| 6,981,728 B2 | 1/2006 | Rasmussen | |
| 9,056,575 B2 * | 6/2015 | Pham | B60P 3/34 |
| 9,193,397 B2 | 11/2015 | Bryant | |
| 9,695,689 B2 * | 7/2017 | Pleasants | B29C 63/34 |
| 10,279,990 B2 | 5/2019 | Ronstadt | |
| 2022/0252199 A1 * | 8/2022 | Taylor | B29C 63/0069 |

FOREIGN PATENT DOCUMENTS

| | | | |
|---|---|---|---|
| CN | 117685448 B * | 4/2024 | |
| DE | 10064444 A1 * | 7/2002 | B29C 63/36 |

(Continued)

OTHER PUBLICATIONS

Ma et al. (CN 117685448 B), machine translation (Year: 2024).*

(Continued)

*Primary Examiner* — Amy R Weisberg
*Assistant Examiner* — Wenwei Zhuo
(74) *Attorney, Agent, or Firm* — Stinson LLP

(57) ABSTRACT

A trailer for staging a pipe lining for in-place installation and curing of the pipe lining has an expandable cover including a roof and side walls. Pipe lining staging apparatus located within the cover can be converted between a collapsed configuration and an expanded configuration. The floor can expand outward from the chassis for holding the staging apparatus in an expanded condition.

22 Claims, 40 Drawing Sheets

(56) References Cited

FOREIGN PATENT DOCUMENTS

| | | | | |
|---|---|---|---|---|
| JP | 59153667 | A | * | 9/1984 |
| KR | 100646407 | B1 | * | 11/2006 |

OTHER PUBLICATIONS

Joeckel (DE 10064444 A1), machine translation (Year: 2002).*
Yanagida (JP 59153667 A), machine translation (Year: 1984).*
Kim (KR 100646407 B1), machine translation (Year: 2006).*
SAK Trailer, color photograph, at least as early as Nov. 8, 2021.

* cited by examiner

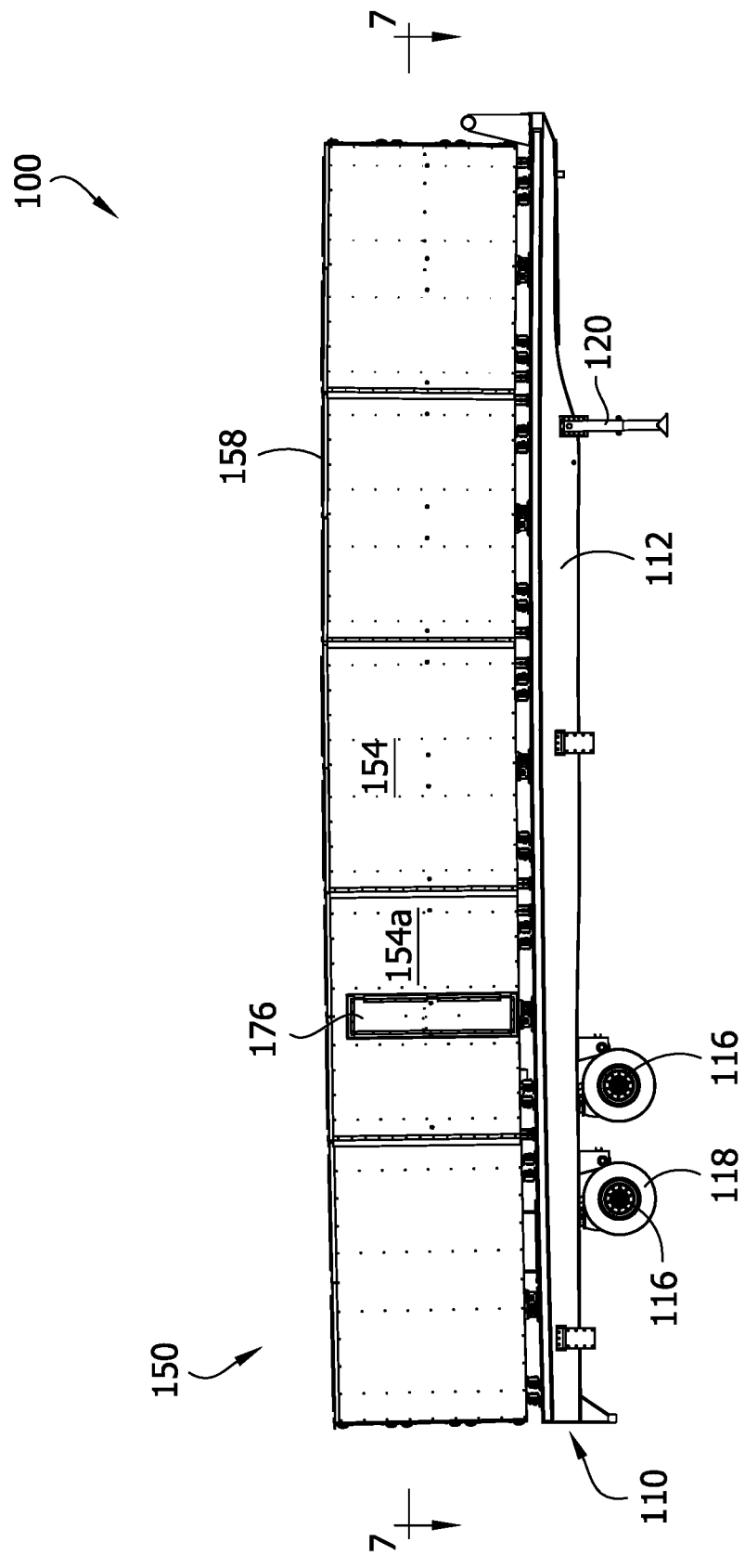

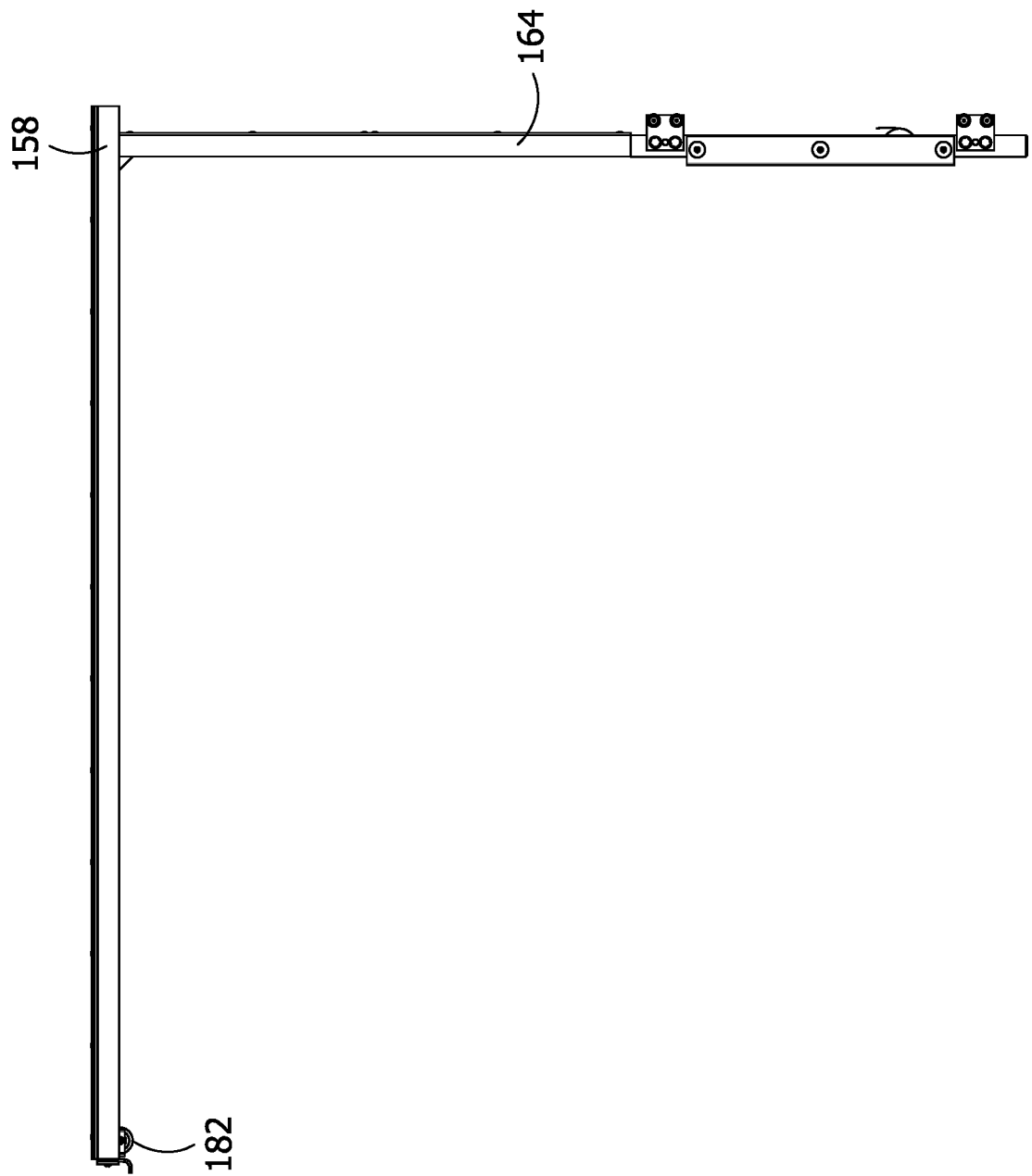

OVER THE HOLE TRAILER

FIELD OF THE INVENTION

The present disclosure relates generally to a trailer for staging a cured-in-place pipe (CIPP) lining for installation in an on-site pipe.

BACKGROUND OF THE INVENTION

Worn and leaky pipes, referred to as host pipes, can be renovated using CIPP linings that are cured to form a new pipe within the old host pipe without requiring substantial digging to remove and replace the pipes already buried in the ground. In general, the CIPP lining process includes positioning a resin-impregnated lining inside a host pipe and pressing the lining into contact with the interior of the host pipe. After the lining is properly positioned in the host pipe, the resin is cured so that the lining forms a new pipe inside the host pipe.

The CIPP installation process occurs on-site where the host pipe is installed, and, consequently, all equipment for preparing, installing, and curing the CIPP lining must be transported to and set up at the site. Such equipment generally includes a resin mixer, a device for injecting the resin into the lining, a conveyor for supporting the lining as resin is injected, a vacuum for wetting out the resin-filled lining, a pinch press for moving the lining, devices for positioning the lining in the host pipe, devices for curing the lining within the host pipe, a cover to prevent the premature curing of wetted-out lining prior to installation (i.e., by excessive exposure to heat and/or light), and an electrical generator to power the equipment.

Conventionally, the CIPP equipment is transported to the host pipe's site via a number of trucks and is then set up on-site. A number of components, such as the resin mixer and the supply of lining, can remain on trucks and be arranged and connected with the remaining equipment to accelerate the setup and takedown process. However, pinch presses and conveyors are configured to handle linings for pipes of up to a 96" diameter and therefore are too wide to be permanently installed on conventional trucks or trailers. In general, the setup process for these components is time-consuming, requiring not only the unloading and reassembly of the equipment on site but also the construction of a temporary shelter over the equipment and the connection of a number of electrical and fluid components. At the end of each job, the equipment must then be disconnected, dismantled, and loaded back onto the trucks.

SUMMARY OF THE INVENTION

In one aspect of the present invention, a trailer for staging a pipe lining for in-place installation and curing generally comprises a horizontal bed extending from a front end of the trailer to a back end of the trailer. The bed includes a chassis and an expandable floor, and the floor is slidably coupled to an upper surface of the chassis. An expandable cover coupled to the bed comprises a roof and a plurality of side walls. The cover extends from approximately the front end of the trailer to approximately the back end of the trailer to define an internal volume of the trailer. Each of the plurality of side walls is coupled to a respective portion of the bed, and at least one of the side walls is coupled to the floor. The roof is coupled to the plurality of side walls. A staging apparatus located within the internal volume comprises a conveyance system and a pinch press that are sized and shaped to receive the pipe lining for staging. The conveyance system has a collapsed configuration and an expanded configuration, and is configured to be converted between the collapsed configuration and the expanded configuration. The conveyance system has a first width when in its collapsed configuration and a second width greater than the first width when in its expanded configuration. The floor is configured to expand laterally outward from the chassis, defining a first internal width of the trailer when the floor is in a retracted position relative to the chassis and defining a second internal width of the trailer when the floor is in an expanded position relative to the chassis. The second internal width is greater than the width of the chassis, and the conveyance system has a width that is less than or equal to the first internal width. The floor, when in the expanded position, defines at least one floor surface spanning at least a distance between a first one of the side walls coupled to the floor and an outermost side of the conveyance system closest to said first one of the side walls when the conveyance system is in the expanded configuration. The roof is configured to expand laterally with the floor and the at least one of the side walls coupled to the floor.

In another aspect of the present invention, a trailer for staging a pipe lining for in-place installation and curing generally comprises a horizontal bed extending from a front end of the trailer to a back end of the trailer. The bed includes a chassis and an expandable floor, and the floor is slidably coupled to an upper surface of the chassis. A cover coupled to the bed comprises a plurality of side walls, and extends from approximately the front end of the trailer to approximately the back end of the trailer to define an internal volume of the trailer. Each of the plurality of side walls is coupled to a respective portion of the bed, and at least one of the side walls is coupled to the floor of the bed. A staging apparatus located within the internal volume comprises a conveyance system and a pinch press. The conveyance system and the pinch press are sized and shaped to receive the pipe lining for staging. Electrical and fluid connections are provided for the staging apparatus. A least one outlet for the electrical and fluid connections is located in the cover and configured to facilitate connectivity with electrical and fluid sources remote from the trailer. The floor is configured to expand laterally outward from the chassis, defining a first internal width of the trailer when the floor is in a retracted position relative to the chassis and defining a second internal width of the trailer when the floor is in an expanded position relative to the chassis. The second internal width is greater than the width of the chassis. The conveyance system has a width that is less than or equal to the first internal width. The floor, when in the expanded position, defines at least one floor surface spanning at least a portion of the distance between one of the side walls coupled to the floor and an outermost side of the conveyance system closest to said first one of the side walls. The roof is configured to expand laterally with the floor and the at least one of the side walls coupled to the floor.

Other objects and features will be in part apparent and in part pointed out hereinafter.

BRIEF DESCRIPTION OF THE DRAWINGS

FIG. 5 is a left side view thereof;

FIG. 34 is an end view thereof;

Corresponding reference characters indicate corresponding parts throughout the drawings.

DETAILED DESCRIPTION OF THE INVENTION

Figure 1:
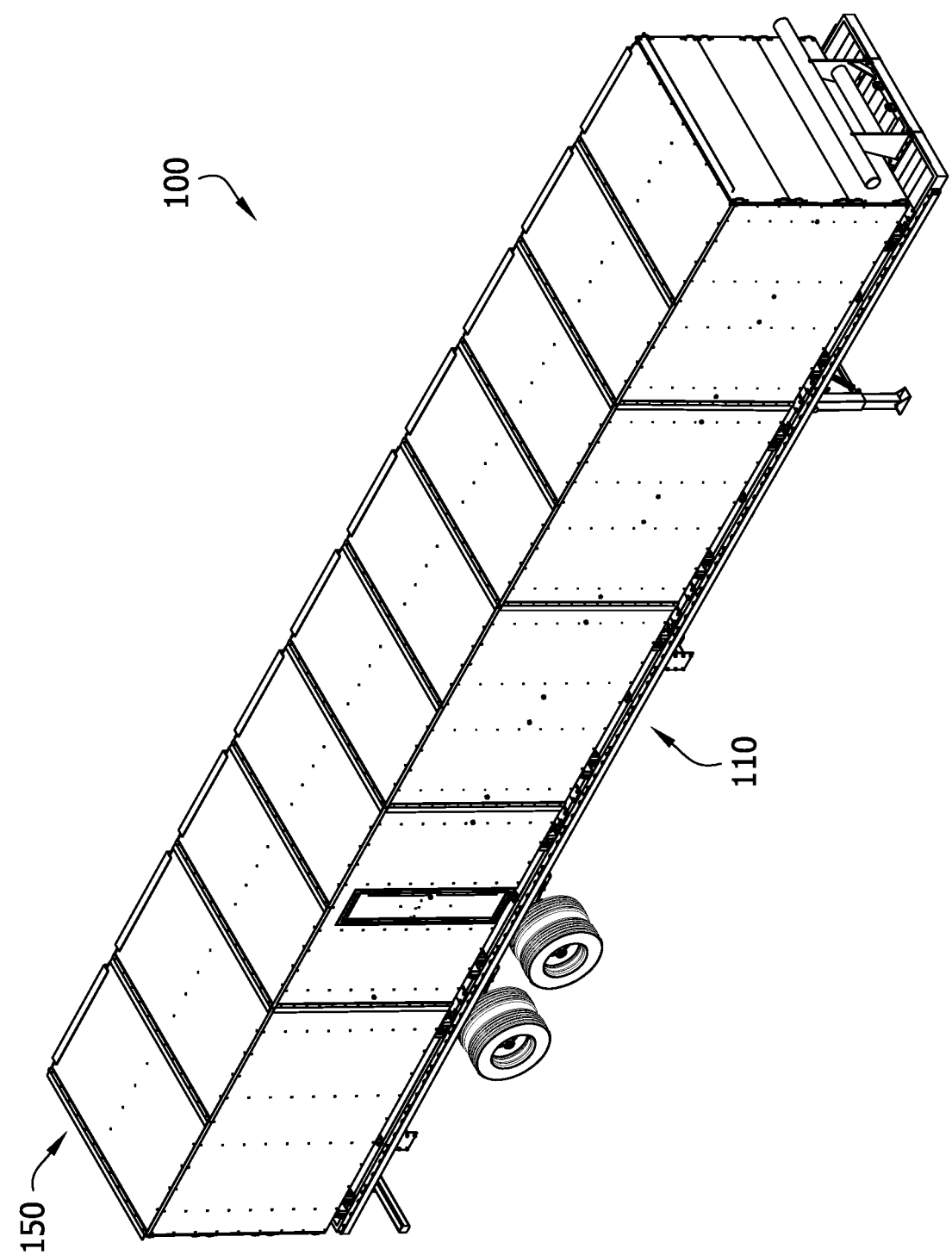
FIG. 1 is a perspective of a trailer in its collapsed configuration.
Figure 2:
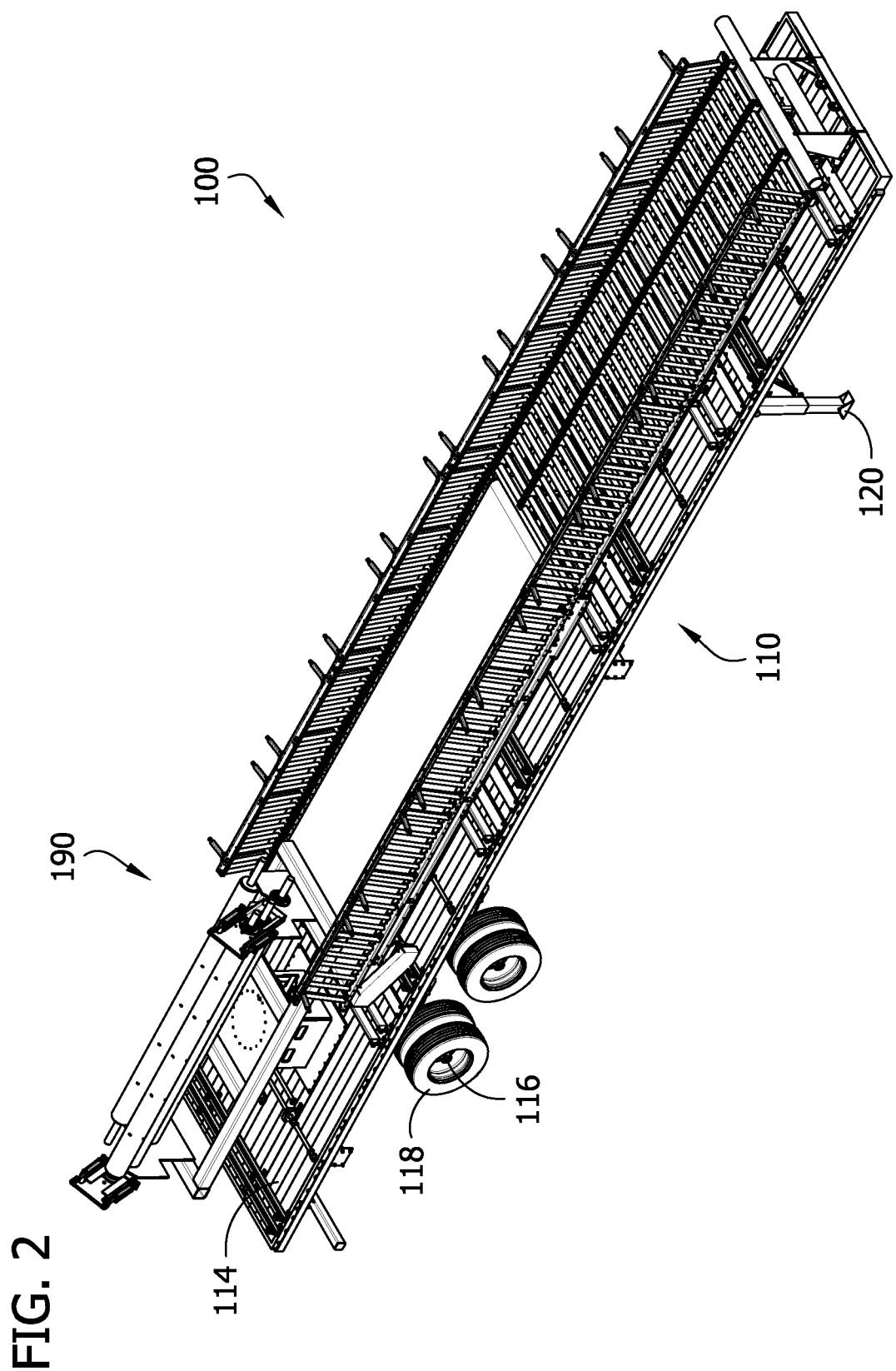
FIG. 2 is the perspective of FIG. 1, with the cover of the trailer removed.

Referring to FIGS. 1 and 2, one embodiment of a trailer for staging a CIPP lining for installation and curing is generally indicated at reference number 100 and extends from a front (or proximal) end—where the trailer can be hitched to a tractor—to a back (or distal) end. The trailer 100 includes a bed, generally indicated at 110, a cover, generally indicated at 150, and a staging system, generally indicated at 190. The cover 150 and the staging system 190 are attached to the bed 110. The trailer 100 can be connected to and/or used with external CIPP equipment (not pictured), such as an electrical power generator, a resin mixer, and a device for installing a lining in a host pipe. As described in further detail below, the trailer 100 and its components (i.e., the bed 110, the cover 150, and the staging system 190) can be arranged in a collapsed ("transport") position, as is generally shown in FIGS. 1-7B, or an expanded ("on site") position, as is generally shown in FIGS. 8-18. When the trailer 100 is in the collapsed position, the bed 110, the cover, 150 and the staging system 190 are arranged for a compact fit within the trailer and generally not for use with the external CIPP equipment. On the other hand, when the trailer 100 is in the expanded position, the bed 110, the cover 150, and the staging system 190 are arranged so that the components can be used with the external CIPP equipment to install lining in a host pipe. Further details about the configurations will be discussed below.

Referring now to FIGS. 3-5 and 17, the bed 110 extends generally horizontally from the front end to the back end of the trailer 100. The bed 110 includes a chassis 112 and a floor 114 that is positioned above the chassis and is configured to slide laterally outward from the chassis, as described in greater detail below. The chassis 112 is generally configured to support the load of the cover 150, the staging system 190, a CIPP lining as it is impregnated with resin and staged for installation, and several workers operating the staging system. In total, it is contemplated that the load carried by the chassis 112 can exceed 40,000 pounds.

Figure 13:
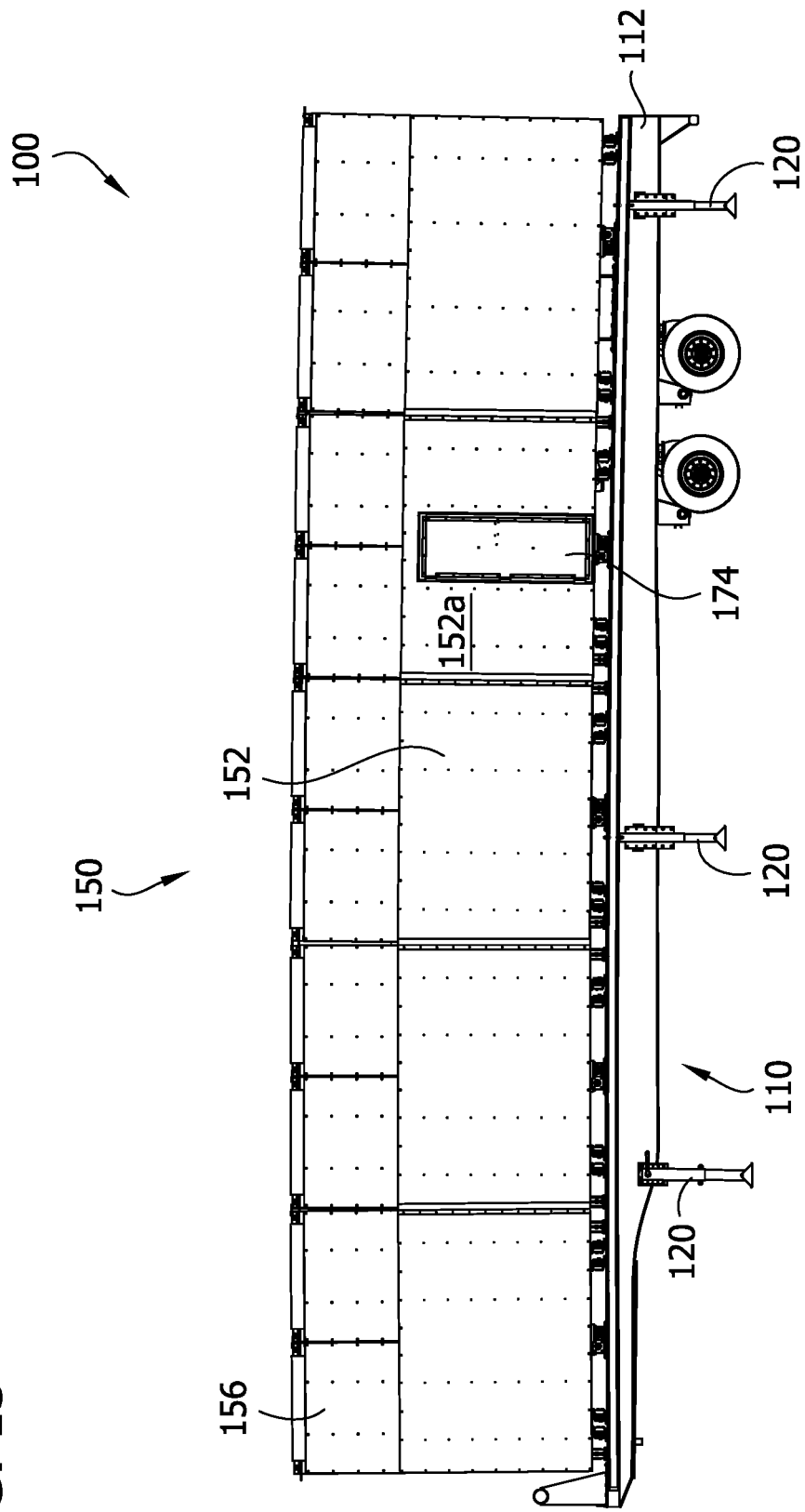
FIG. 13 is a right side view thereof.
Figure 14:
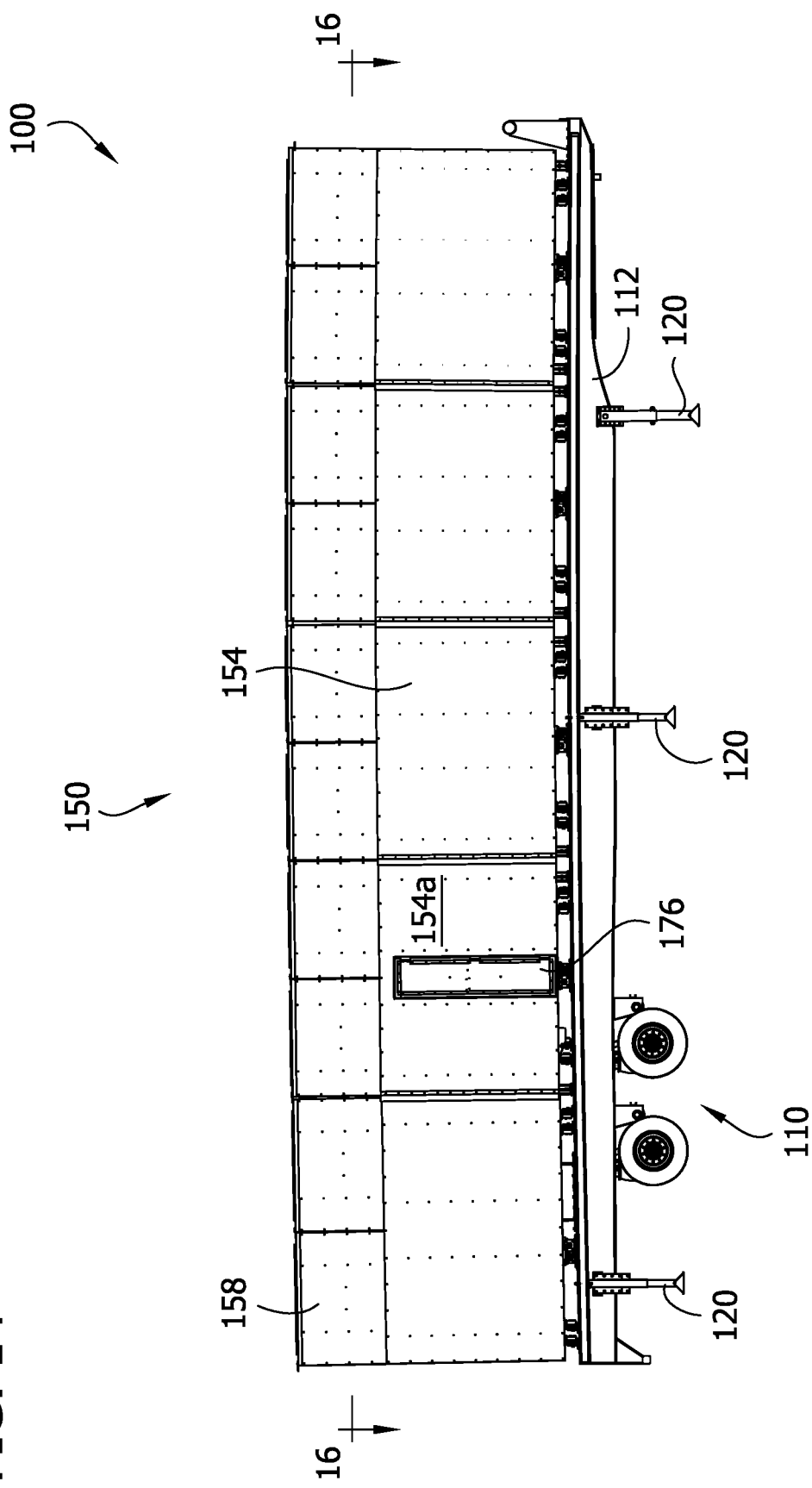
FIG. 14 is a left side view thereof.
Figure 15:
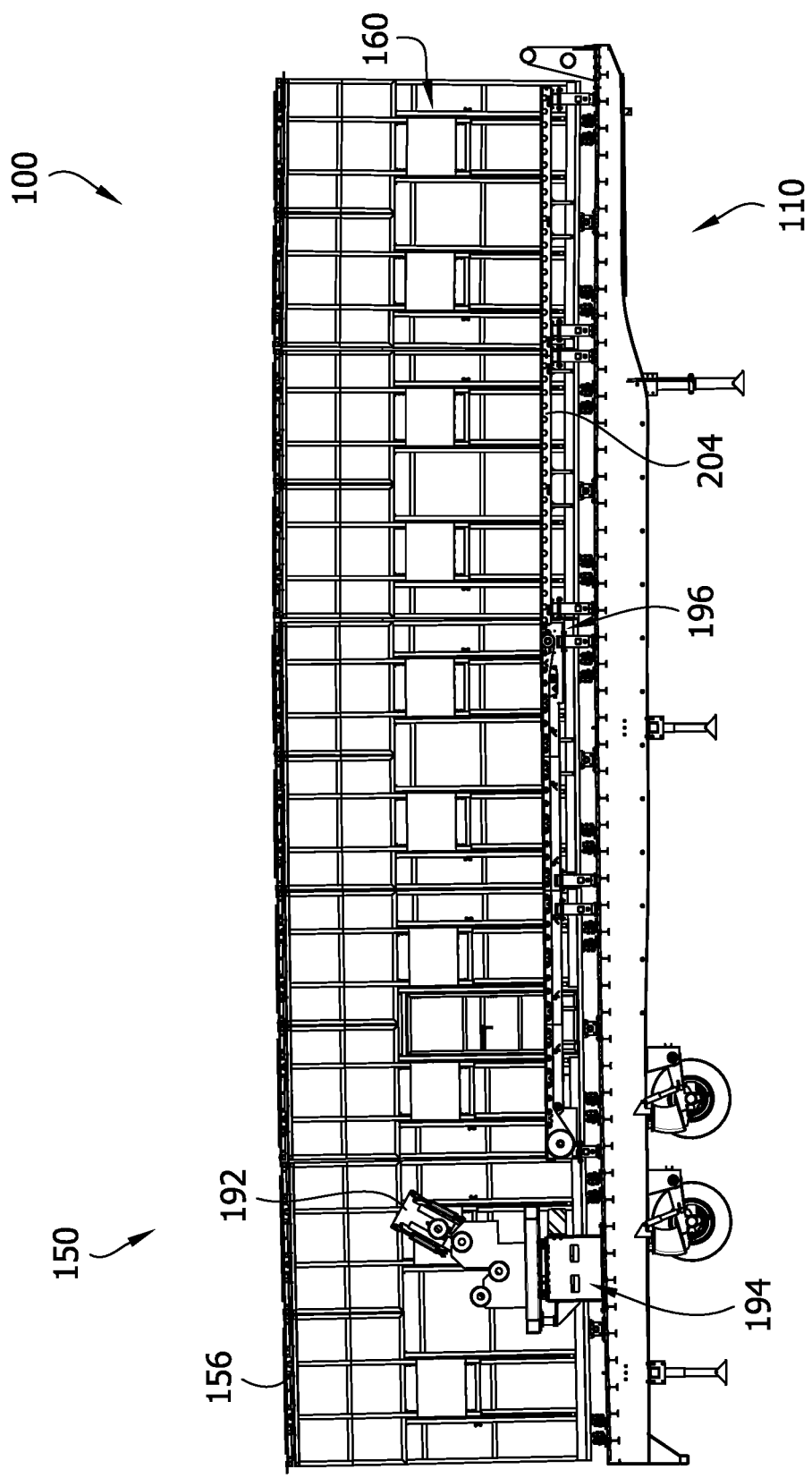
FIG. 15 is a section taken in the plane including line 15-15 of FIG. 11.

Referring now to FIGS. 1 and 2-5, two axles 116 and two pairs of jacks 118 are coupled to an underside of the chassis 112. Wheels 118 are also attached to the axles 116. In the pictured embodiment, the axles 116 are positioned near the back end of the trailer 100 and extend generally across a width of the chassis 112. The axles 116 are spaced apart lengthwise of the trailer 100 approximately 60 inches to 120 inches to provide improved load distribution when the trailer is fully loaded. In some embodiments, the axles can be re-positioned on the chassis to change the distance between the axles for purposes of meeting regulations in different jurisdictions. As described in greater detail below, the axles 116 are located generally beneath the heavier components of the staging system 190, so a significant amount of the load will be carried by the axles 116 and corresponding wheels 118. The jacks 120 are spaced apart on the underside of the chassis 112 opposite the axles and nearer the front end of the trailer 100. As can be seen in FIGS. 13-14, a first pair of the jacks 120 is located near a center point along the length of the chassis 112, and a second pair of the jacks can be located approximately halfway between the first pair of jacks and the front end of the trailer 100. A third pair of the jacks 120 can be placed near the back end of the trailer 100. The wheels 118 remain in contact with a ground surface during all stages of operation of the trailer 100, including when the trailer is being transported and when the trailer is placed on-site. In contrast, the jacks 120 are configured to be extended and/or retracted so they can engage the ground surface when the trailer 100 is on site but are clear of the ground surface when the trailer is being transported.

Figure 3:
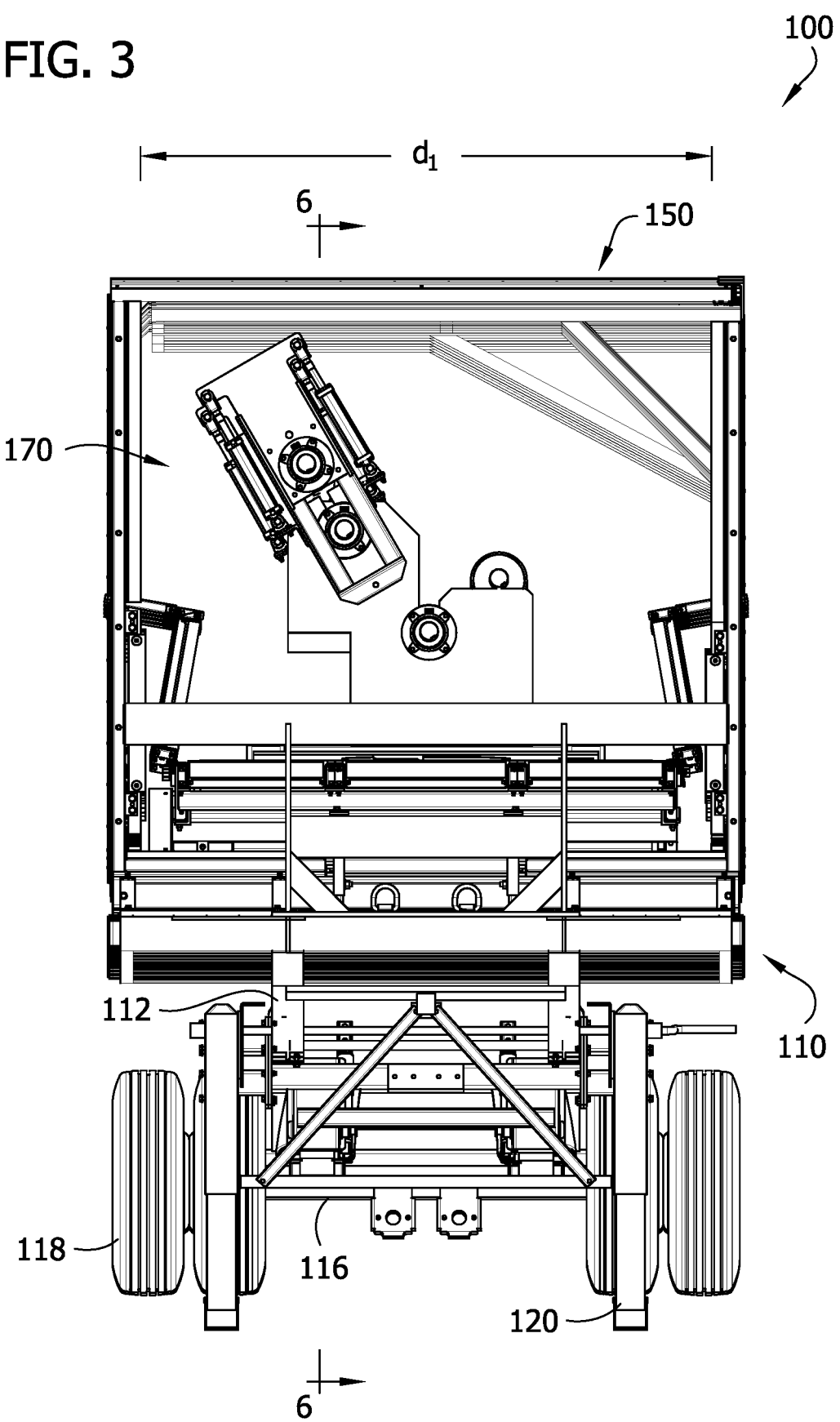
FIG. 3 is a front elevation thereof, with a portion of the cover removed.

As can be seen in FIGS. 1-3, near the front end of the trailer 100, the chassis 112 is configured so the trailer be hitched to and supported by a tractor (truck), as is generally understood in the art. Thus, it is contemplated that the truck will support the load on the front end of the trailer 100 when the trailer is being transported. Moreover, as described in greater detail below, the cab can be disengaged from the trailer 100 when on site for improved access to the front end of the trailer, allowing a CIPP lining to be fed into the trailer for staging as described in greater detail below.

Figure 16:
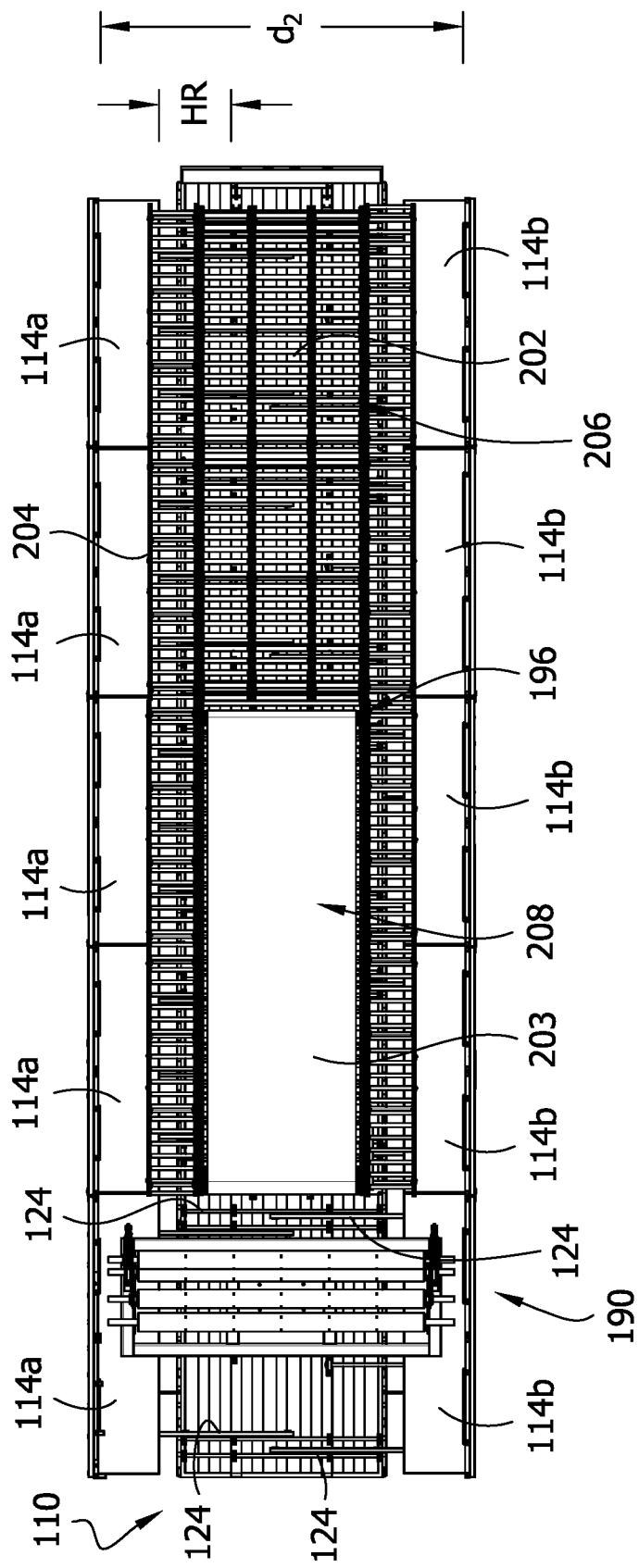
FIG. 16 is a section taken in the plane including line 16-16 of FIG. 14.
Figure 17:
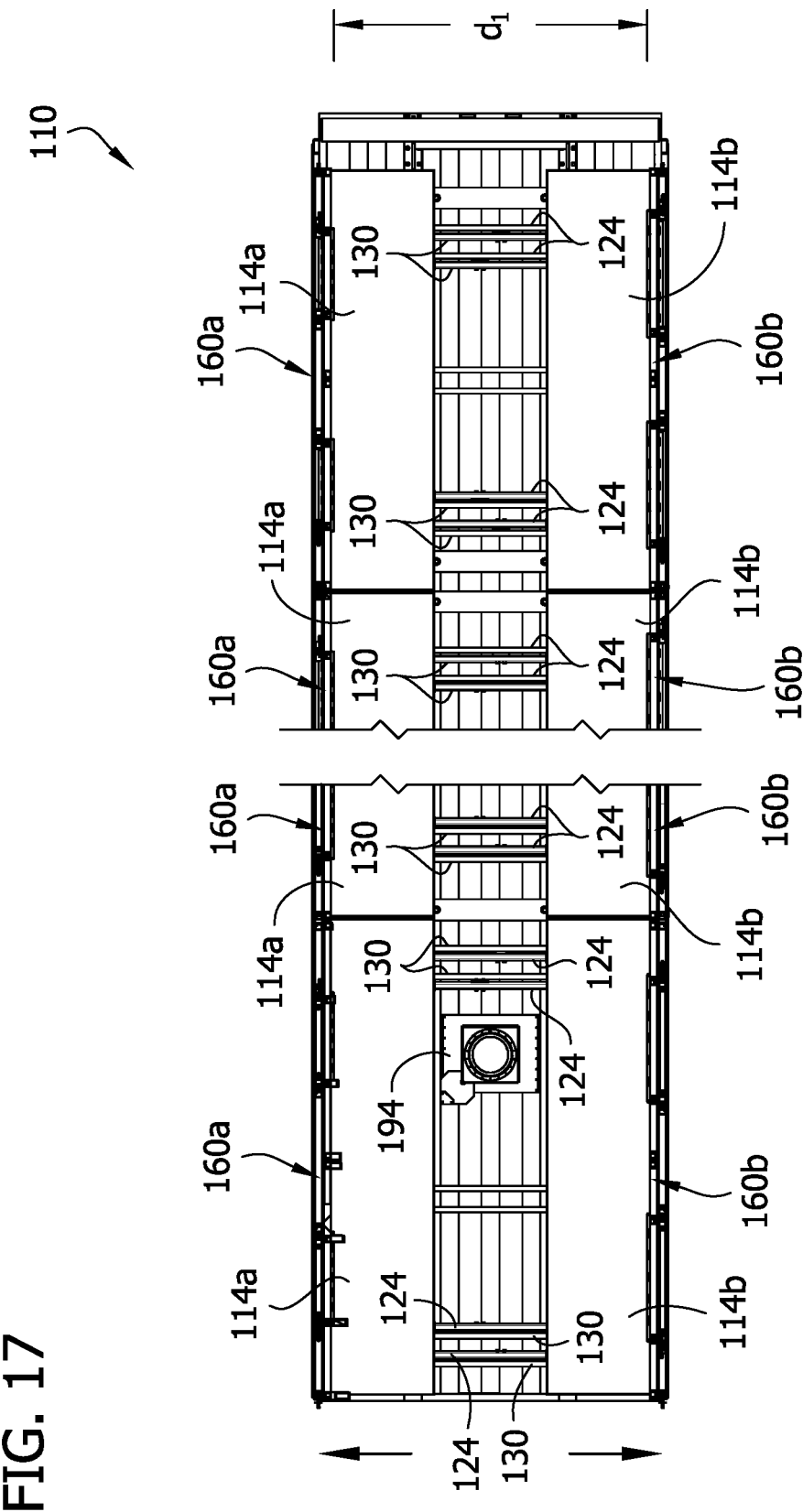
FIG. 17 is the section of FIG. 16, with the staging system of the trailer removed from view, and the trailer in its collapsed configuration.
Figure 26:
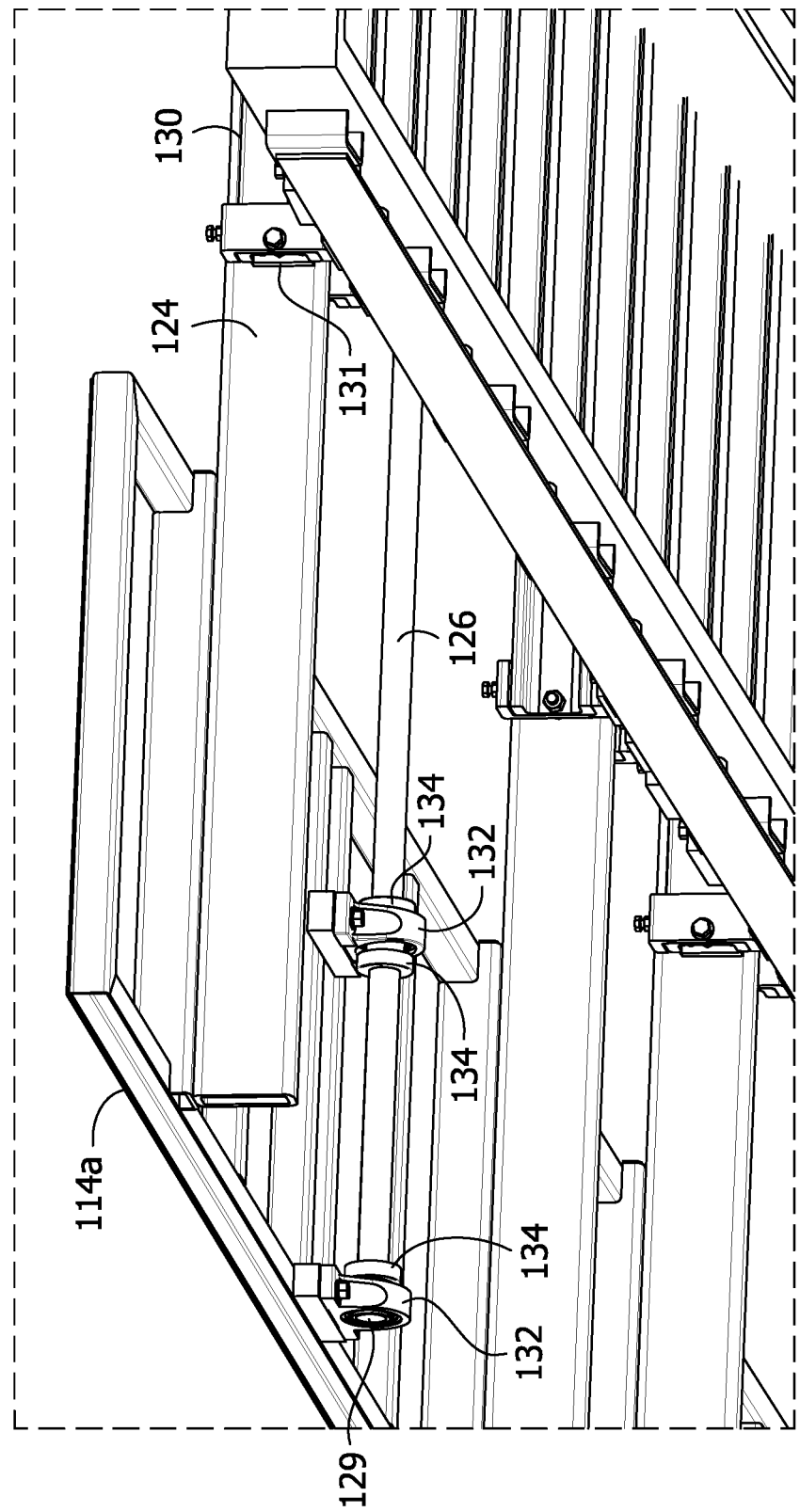
FIG. 26 is a fragmentary bottom side perspective of the back end of the trailer of FIG. 9, with the cover and the staging system of the trailer removed.
Figure 35A:
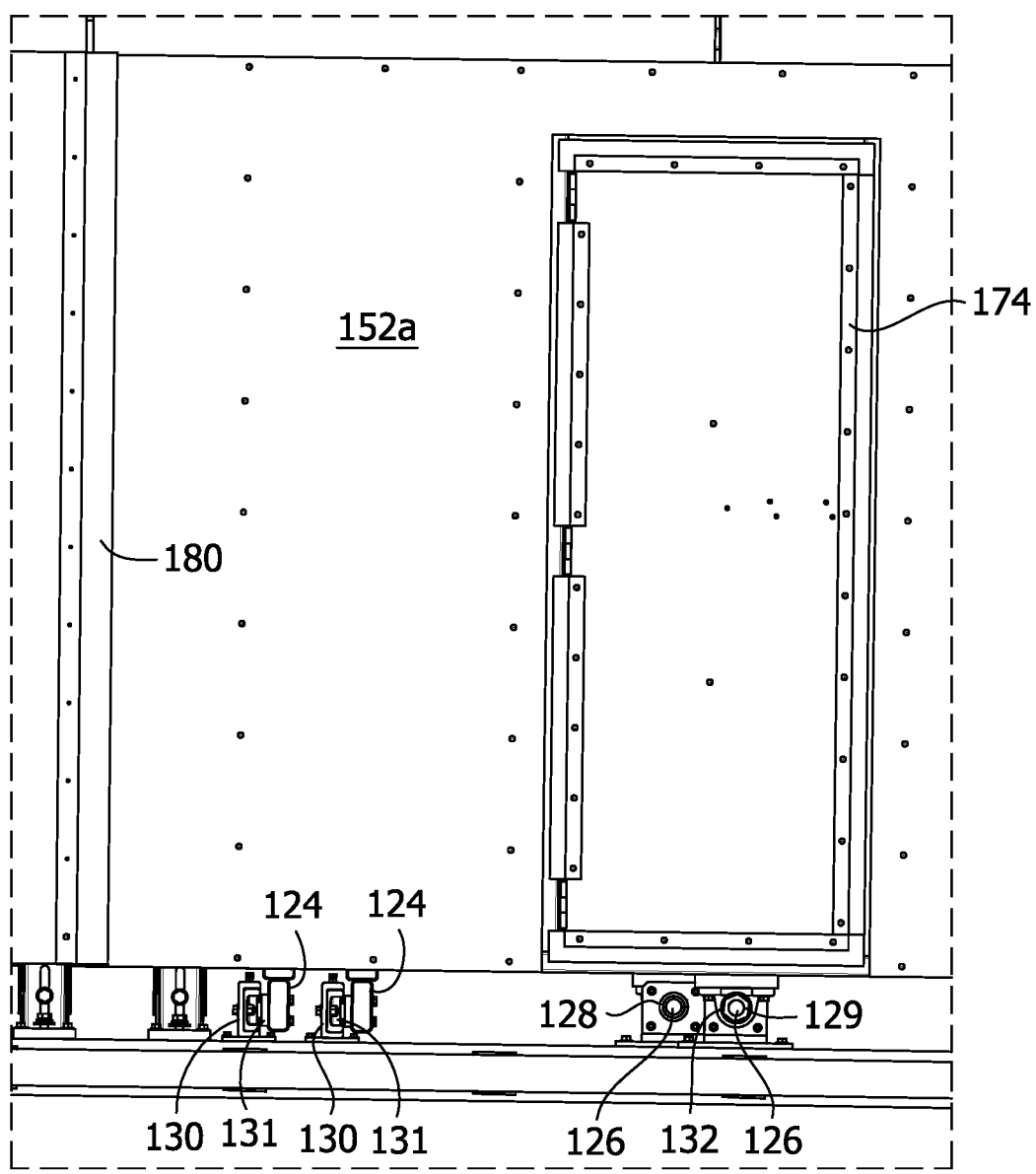
FIG. 35A is an enlarged fragment of the trailer of FIG. 13, showing a personnel portal.
Figure 35B:
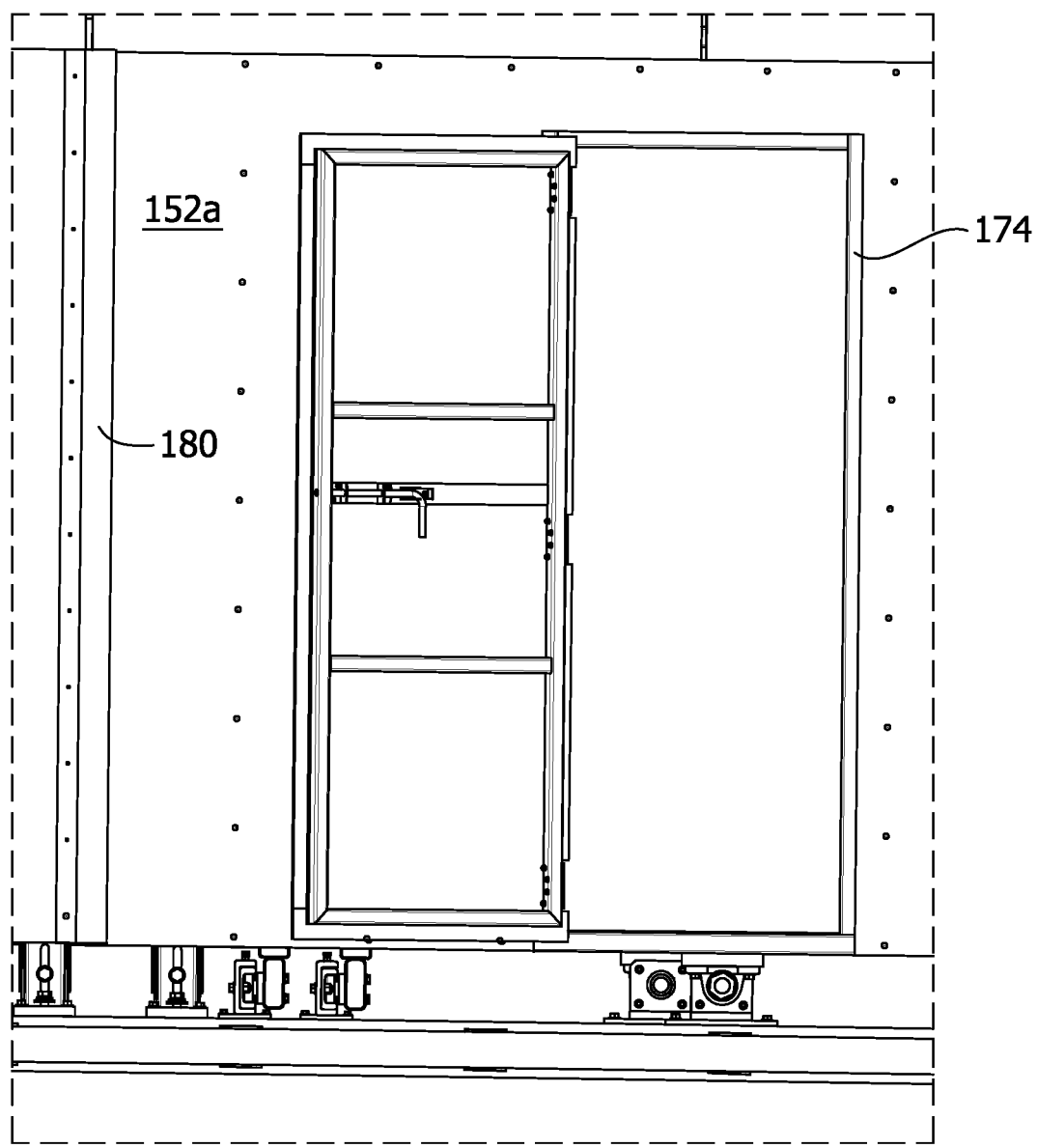
FIG. 35B is the view of FIG. 35A, showing the personnel portal in the open position.
Figure 36A:
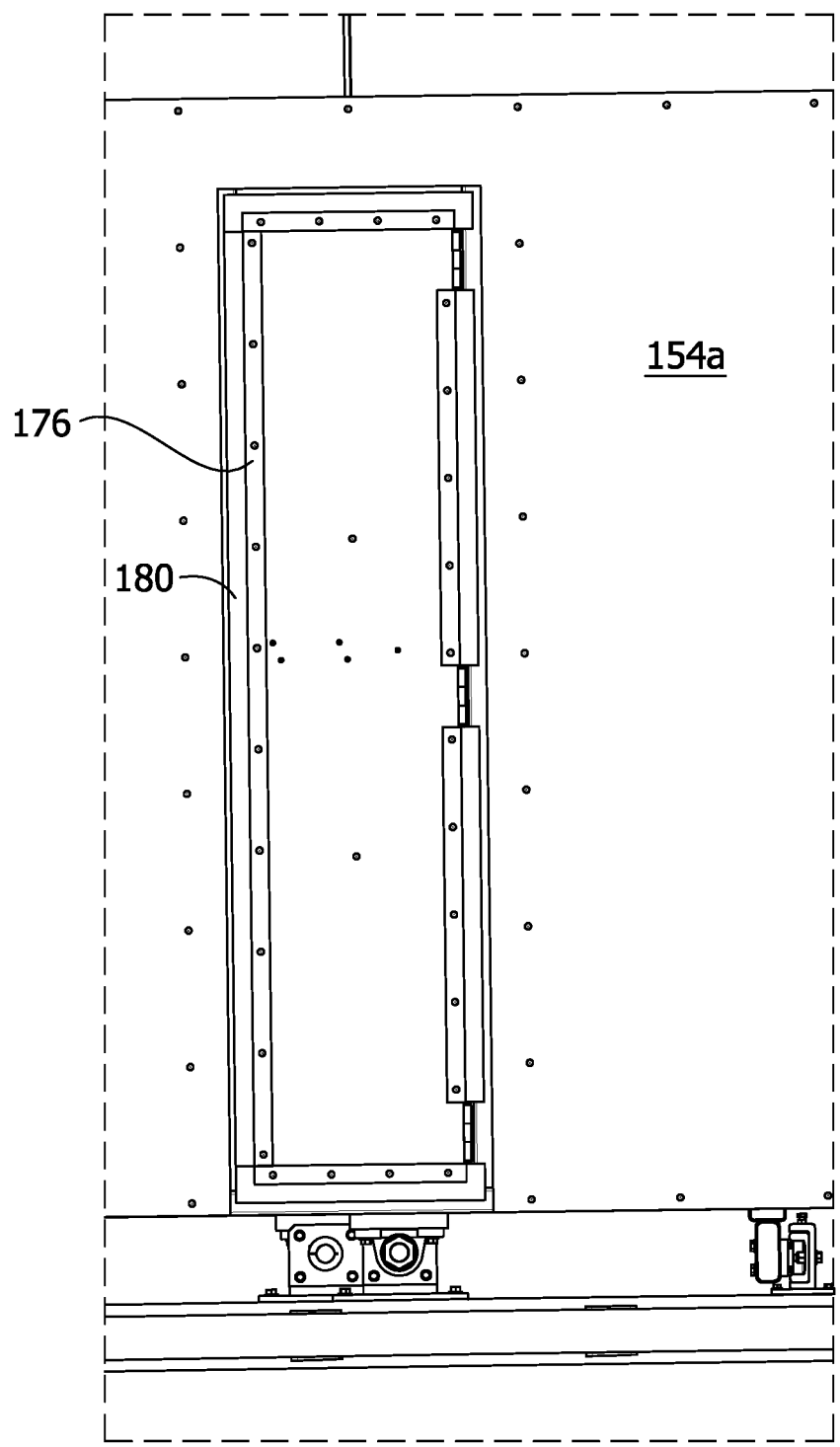
FIG. 36A is an enlarged fragment of the trailer of FIG. 14, showing a utility access portal.
Figure 36B:
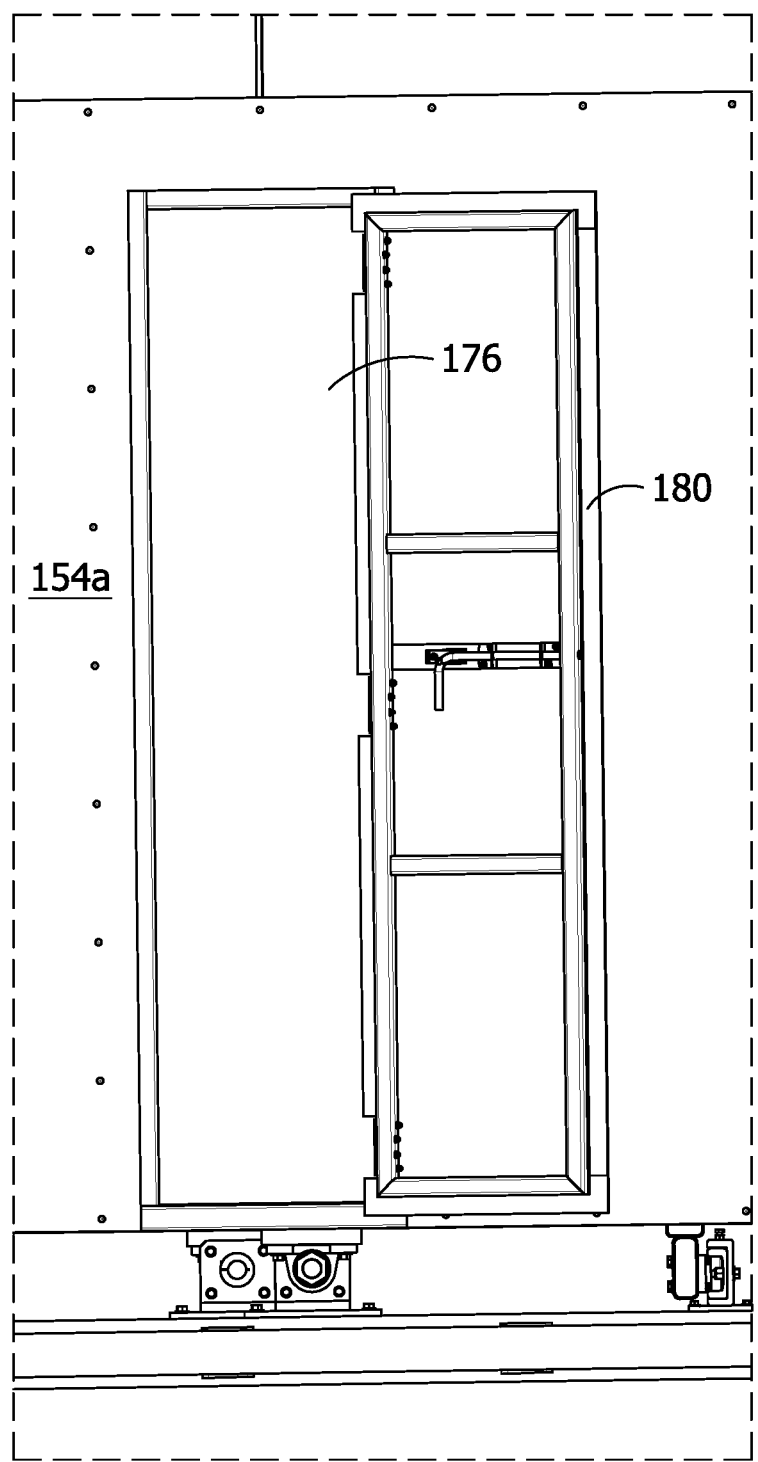
FIG. 36B view of FIG. 36A, showing the utility access portal in the open position.

Referring to FIGS. 16 and 17, the floor 114 is divided longitudinally into five right sections 114a and five left sections 114b on opposite sides of the bed 110, each section defining a floor surface extending along a respective side of the bed from the front end to the back end of the trailer 100. Each of the sections of the floor 114a, 114b is supported by a plurality of beams 124 that are placed apart in parallel along the length of the chassis 112 (i.e., from the front end of the trailer 100 to the back end). The beams 124 are connected to the chassis 112 in a manner that permits a respective section of the floor 114 to slide laterally outward and/or inward relative to the chassis over a horizontal travel range HR on a respective side of the chassis. Specifically, in the present embodiment, the beams 124 are wheel-mounted to channels 130, and the channels are firmly fixed to the chassis. The channels 130 open toward the back end of the trailer 100. The beams 124 are each disposed adjacent and parallel to a respective one of the channels 130. As can be seen in FIGS. 26 and 35A, the beams 124 each include one or more bearing members 131 that project into the channel 130 through its open back side and are engaged with the channel so that the channel may guide and constrain the movement of the beams as they expand and retract. It will be appreciated that the manner in which the beams 124 are connected to and can travel relative to the chassis 112 can be accomplished any number of different ways.

Figure 24:
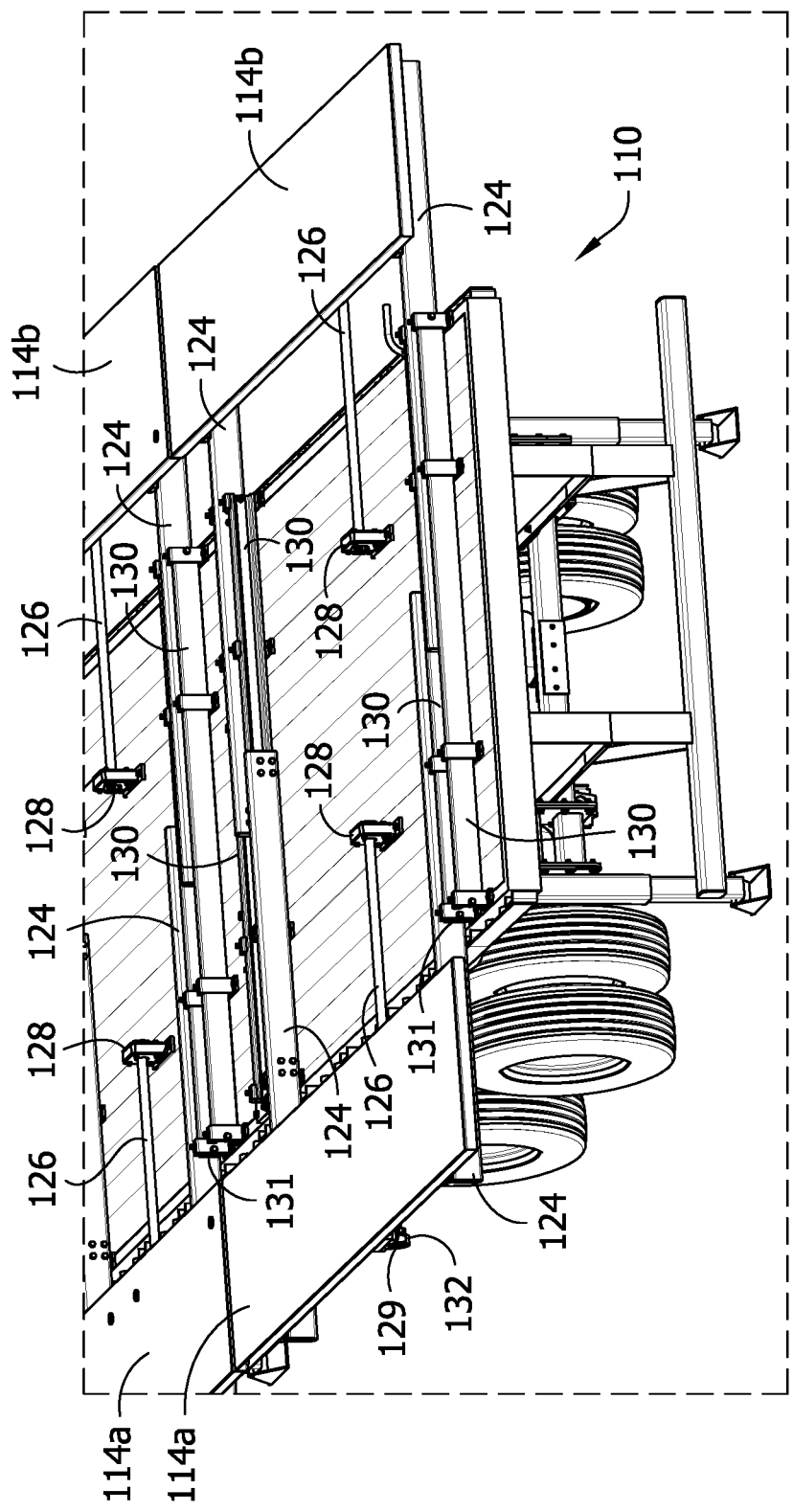
FIG. 24 is a fragmentary perspective of the back end of the trailer of FIG. 9, with the cover and the staging system of the trailer removed.
Figure 25:
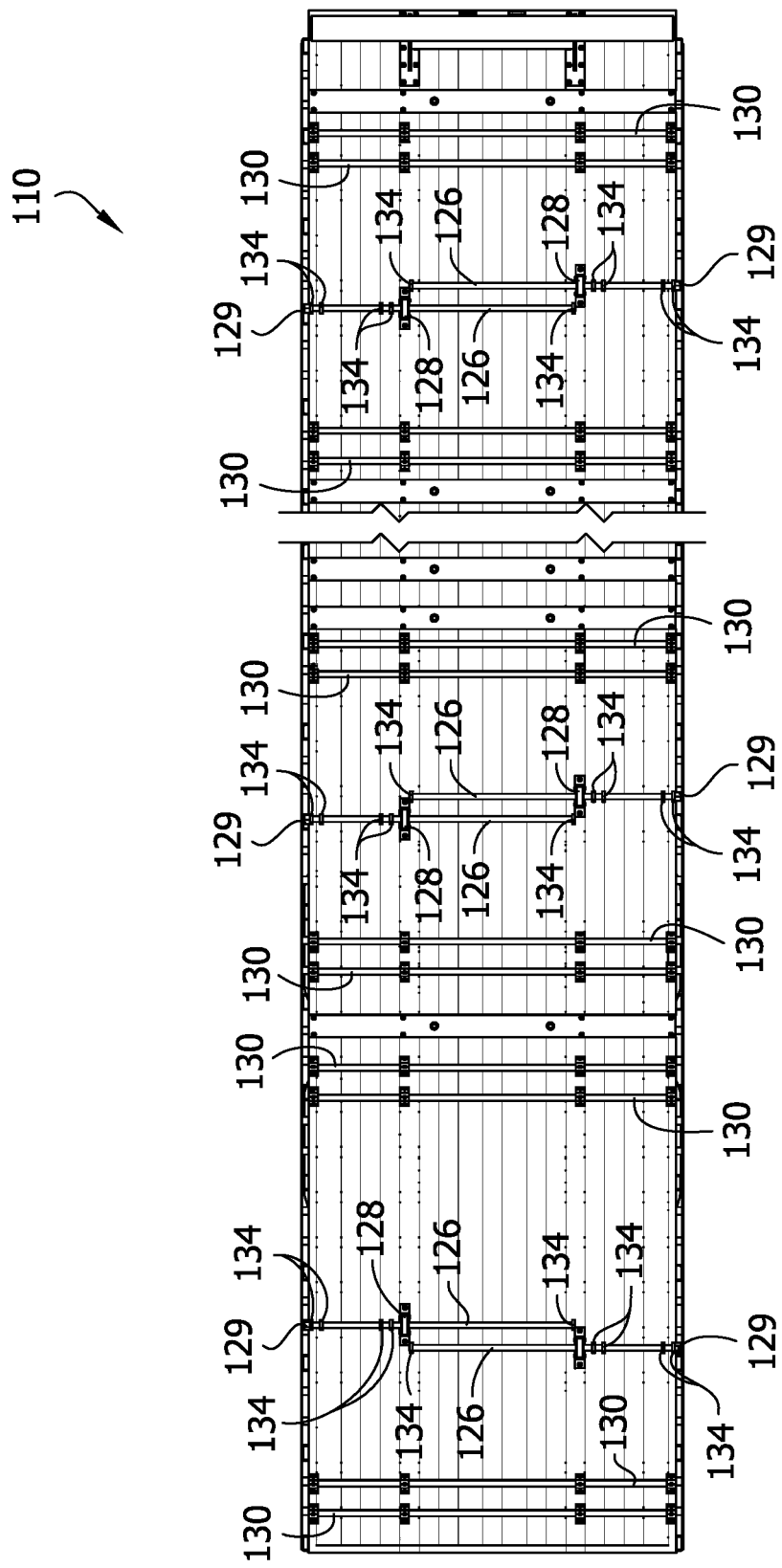
FIG. 25 is a fragmentary top plan of the bed of the trailer of FIG. 1.

Referring now to FIGS. 18, 24-26, and 35A, the structure for driving movement of the floor sections 104a, 104b of the illustrated embodiment will be explained. Each floor section 114a, 114b is guided by a single acme screw 126 which can be driven inward or outward by a hex (driving) nut 129 fixed to an outer end of the acme screw. As is seen in FIG. 26, a pair of aligned bearings 132 are attached to the underside of each of the floor sections (114a shown in figure), for conjoint movement with the floor sections. The acme screw 126 is received through the bearings 132 for rotating with respect to the bearings. Additionally, a collar 134 is clamped onto the acme screw 126 adjacent the bearings 132 on each side. The collars 134 prevent movement of the acme screw 126 along its longitudinal axis with respect to the bearings 132. Further, as is seen in FIG. 24, an acme nut 128 is firmly secured to the bed 110 so that it remains in place as the floor sections 114a, 114b are extended and retracted. The acme screw 126 is fed into the acme nut 128, and threadably engaged with the acme nut. As result, rotation of the acme screw 126 produces movement of the screw through the acme nut 128 for moving a respective one of the floor sections 114a or 114b. Lastly, a driving nut 129 is secured to the outside end of the acme screw 126. The driving nut 129 is configured to receive a socket fitting (not shown) for driving rotation of the acme screw 126. By rotating the outside acme nut 128, a user can drive the respective floor section 114a or 114b inward or outward as far as is permitted by the features of the bed 110. It is contemplated that a motor or other driving mechanism (or combination of mechanisms) can be used to drive the lateral movement of each section in a generally known manner. In the illustrated embodiment, a handheld electric drill (not shown) having a socket bit to engage the driving nut 129 is used. It will be understood that the above-described driving mechanism can be adapted to drive both sections of the floor in opposing directions simultaneously.

Figure 28:
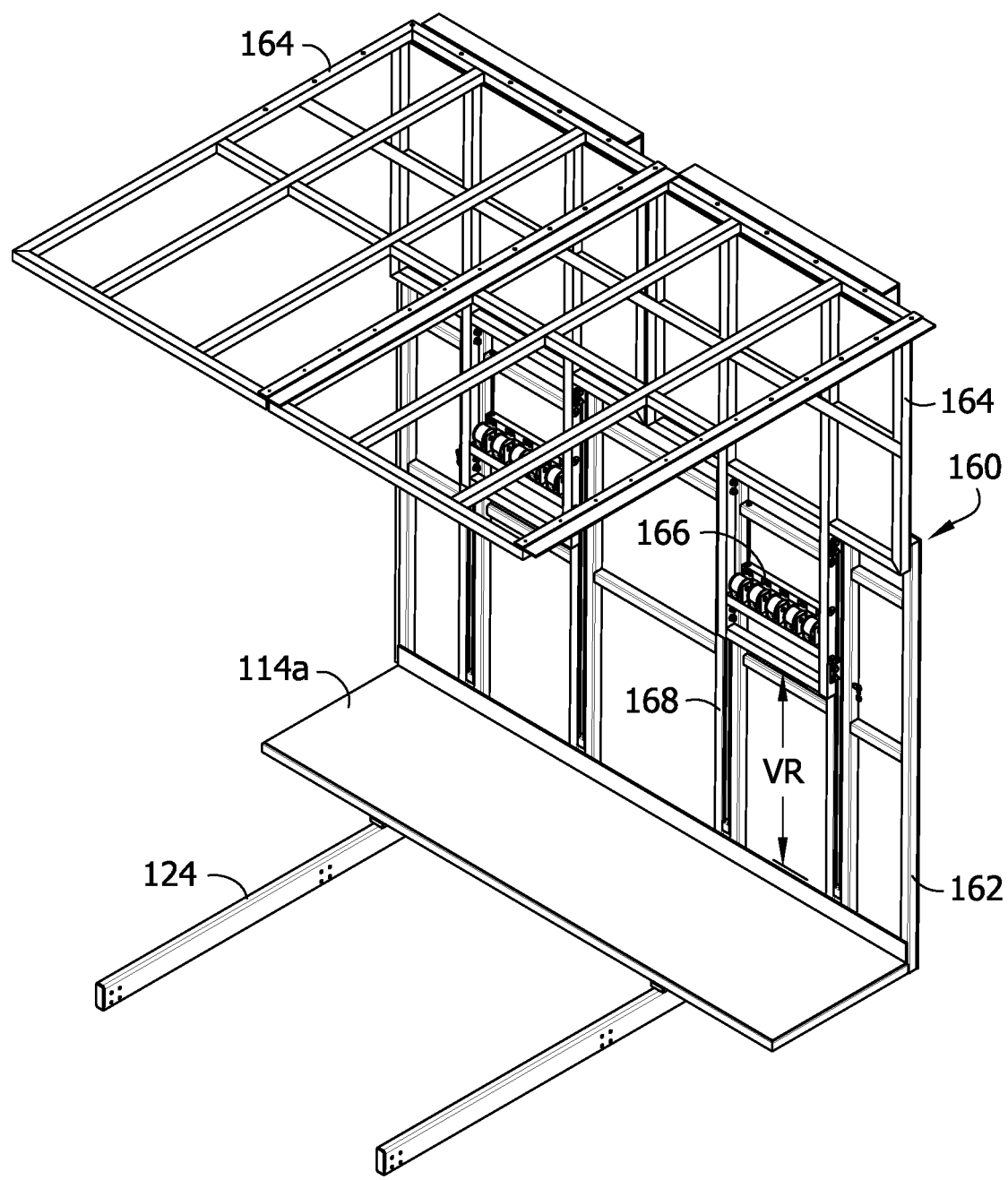
FIG. 28 is a fragmentary perspective of the floor and cover of the trailer of FIG. 9, with portions of the ceiling section removed.
Figure 29:
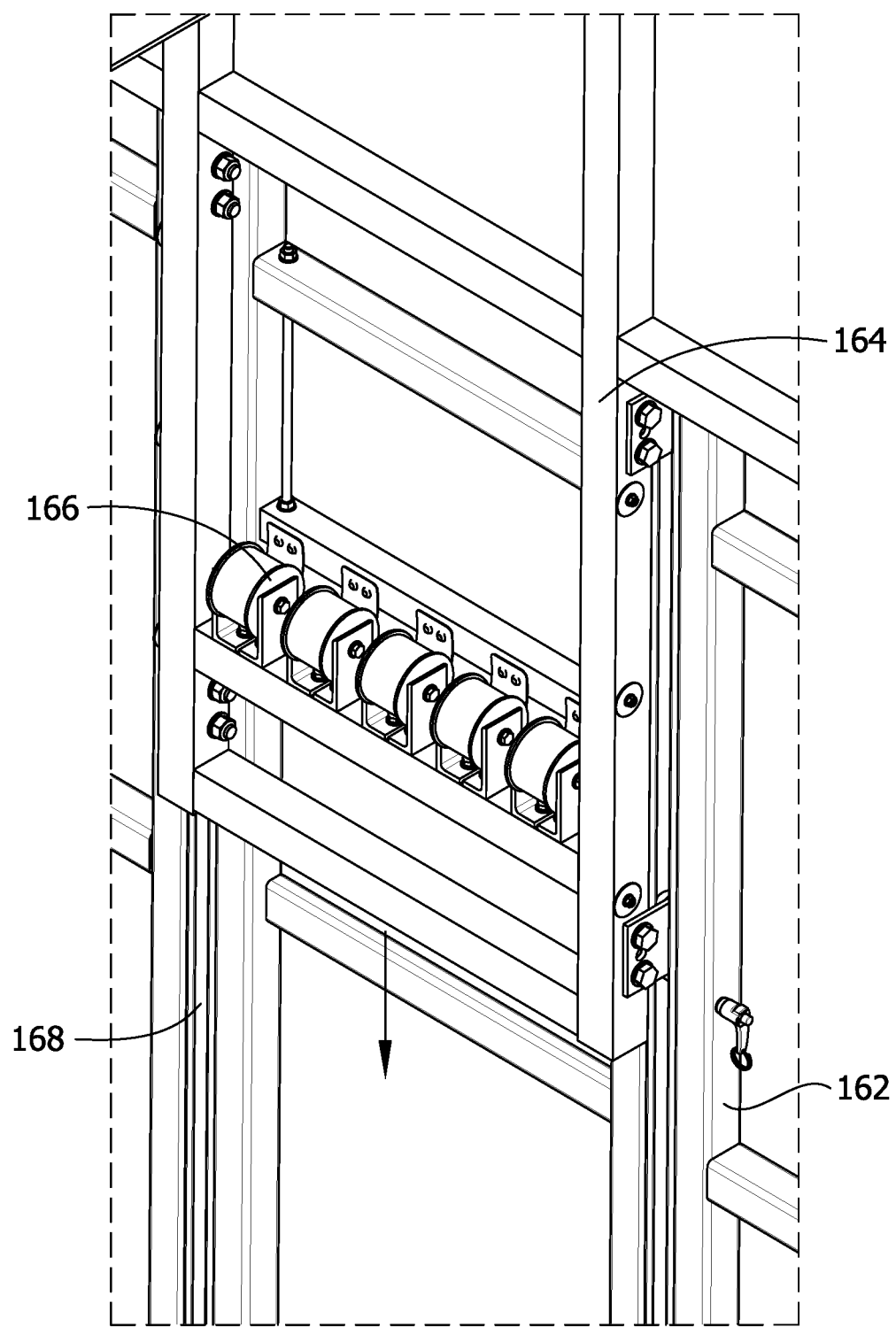
FIG. 29 is an enlarged fragment of FIG. 28.
Figure 30:
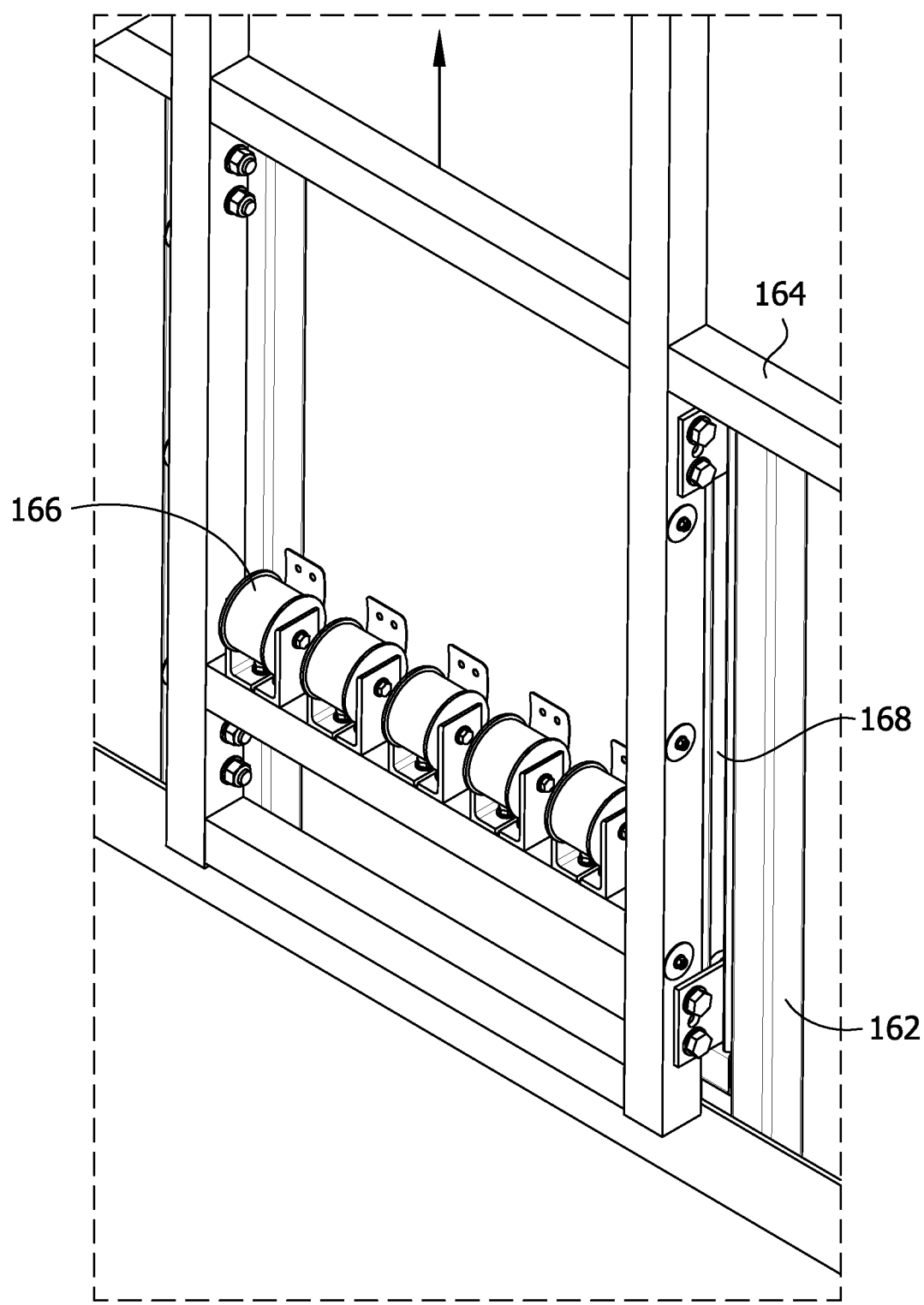
FIG. 30 is the view of FIG. 29, with a mobile frame element of the cover in its collapsed configuration.

Now referring to FIGS. 5, 8, and 13-14, the cover 150 includes a plurality of side walls 152, 154 lined up along respective longitudinal sides of the trailer 100 and a plurality of ceiling sections 156, 158 positioned above each respective side wall 152, 154 to define a roof of the trailer. The cover 150 further includes a plurality of wall frame assemblies 160 which are configured to secure the side walls 152, 154 in place relative to the floor sections 114a, 114b, as described in greater detail below. Additionally, the wall frame assemblies 160 are configured to connect each one of the ceiling sections 156, 158 to a corresponding side wall 152, 154, respectively, so that the bed 110 and the cover 150 together define an internal volume of the trailer 100. The cover 150 is configured to travel laterally with the floor sections 114a, 114b as the floor is expanded. As will be explained in more detail below in connection with FIGS. 28-30, the cover 150 is also configured to expand vertically with the assistance of drive mechanisms 166 and rails 168 within the wall frame assemblies. The horizontal expansion and the vertical expansion of the cover 150 cause the internal volume of the trailer 100 to grow, which in turn provides space for the staging system 190 to be rapidly set up on the trailer for on-site operation. The expansion of the cover 150 further provides space for workers to more comfortably operate the staging system and to handle equipment and/or materials within the internal volume.

Figure 4:
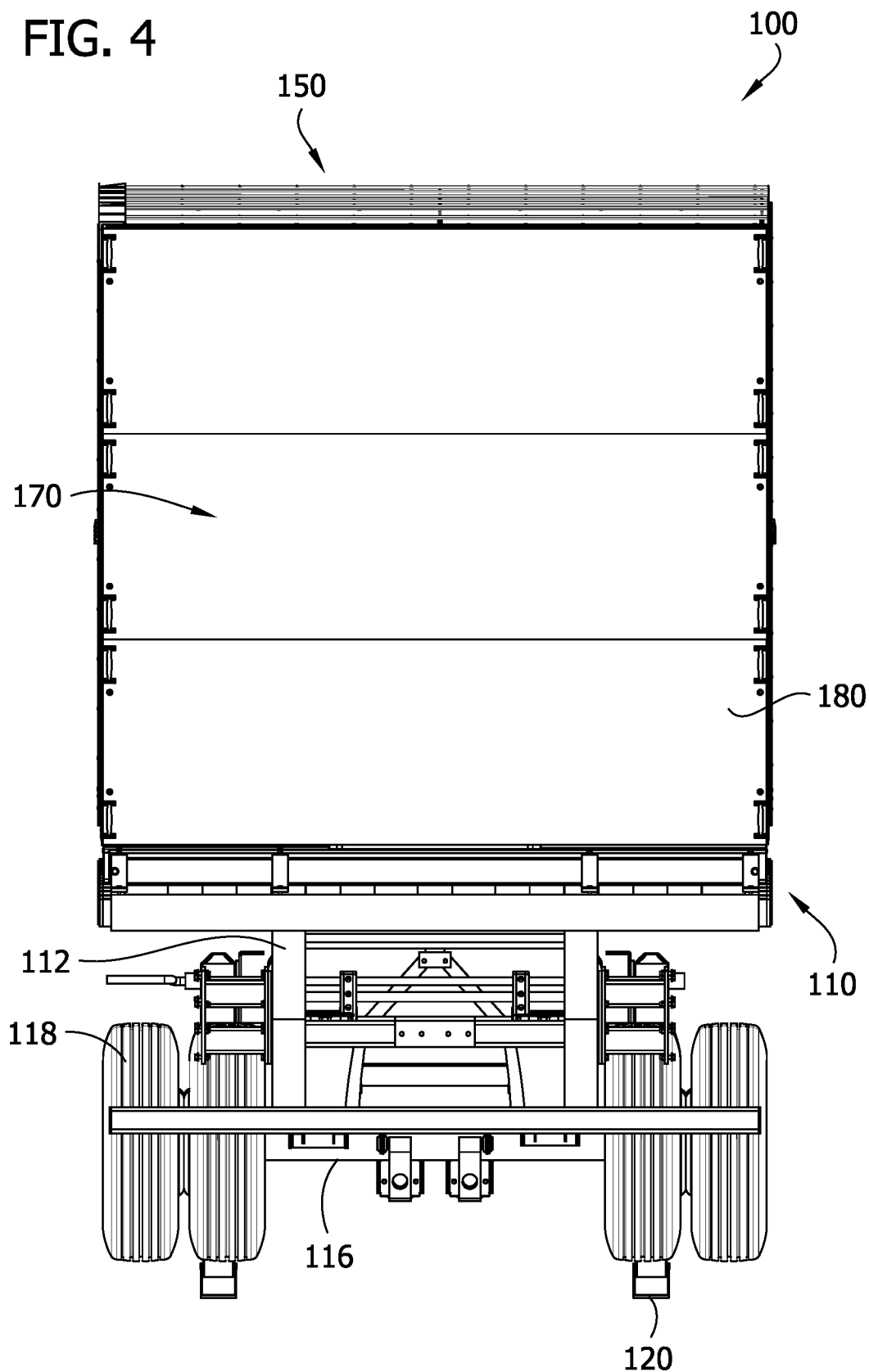
FIG. 4 is a rear elevation thereof.
Figure 6A:
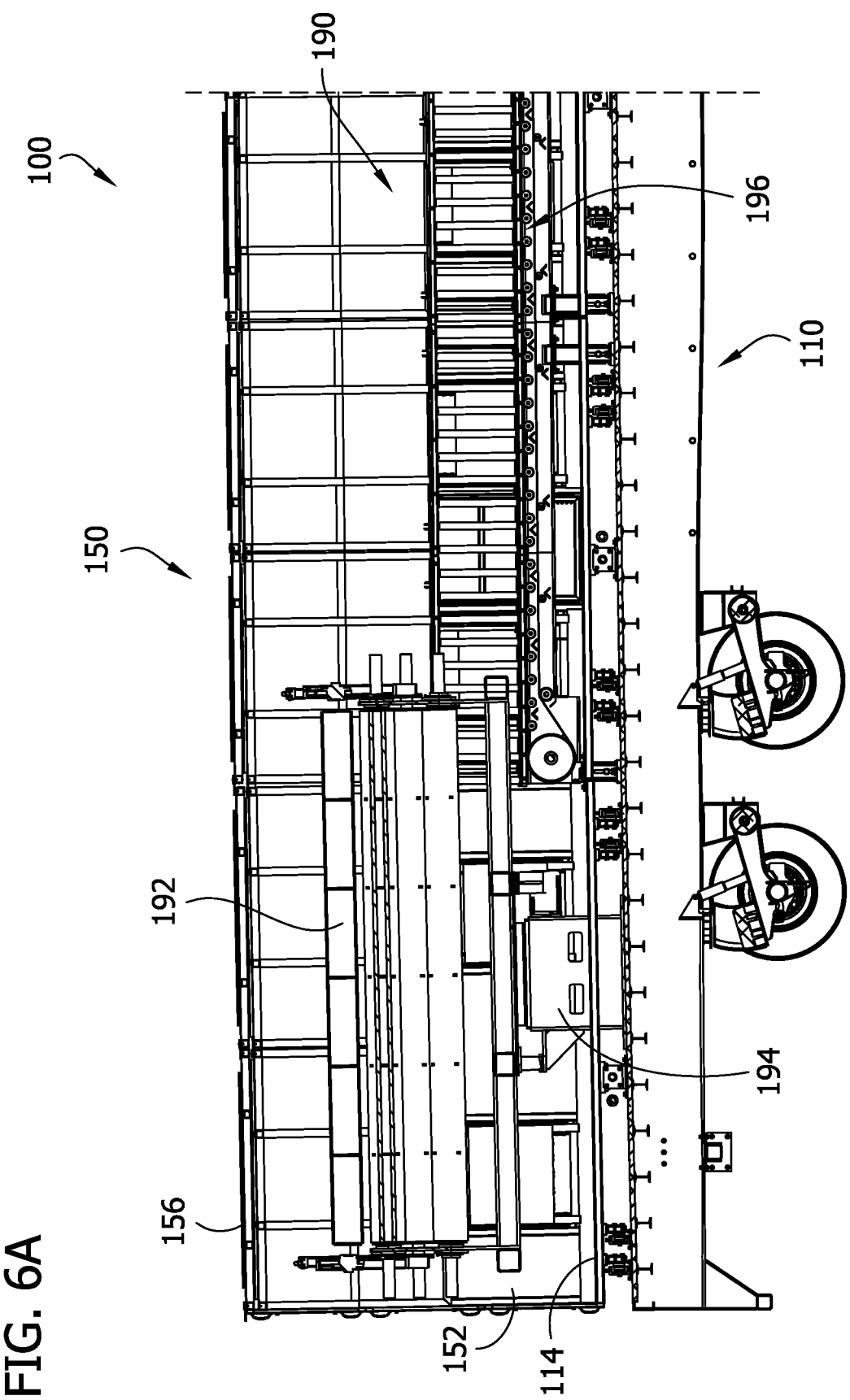
FIG. 6A is a fragment of a section taken in the plane including line 6-6 of FIG. 3, showing a rear end portion of the trailer.
Figure 6B:
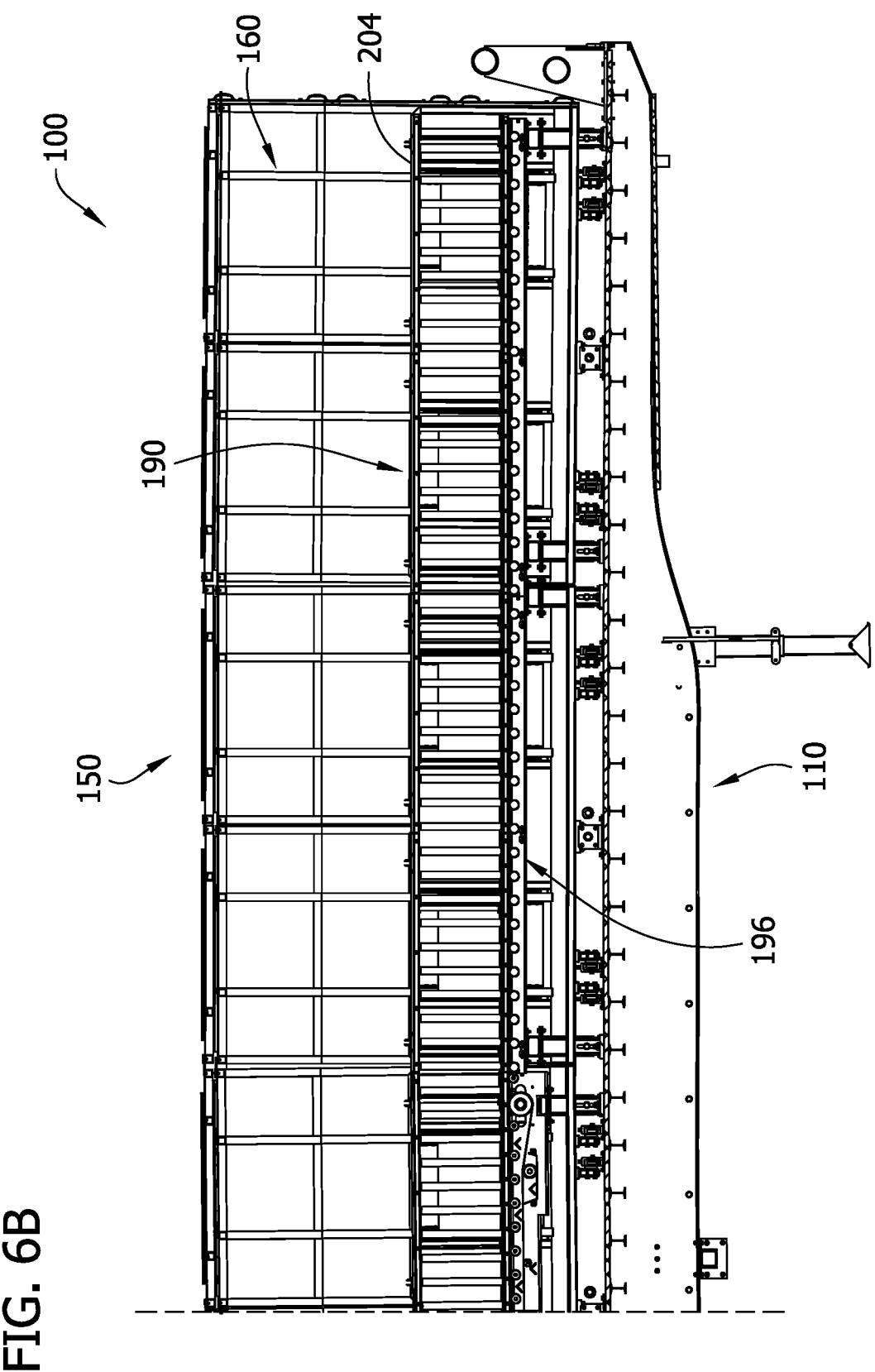
FIG. 6B is a fragment of a section taken in the plane including line 6-6 of FIG. 3, showing a forward end portion of the trailer.
Figure 7A:
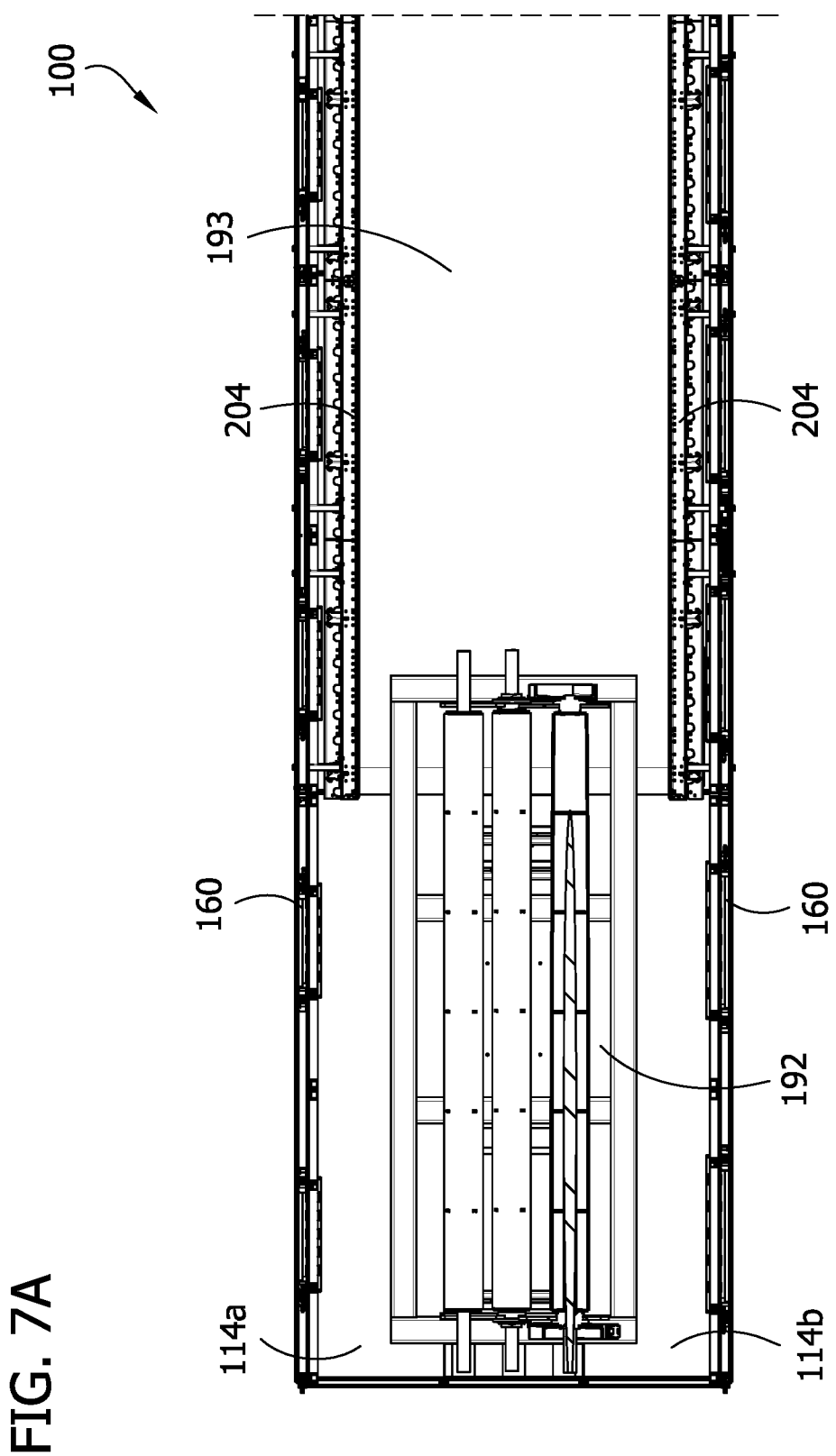
FIG. 7A is a fragment of a section taken in the plane including line 7-7 of FIG. 5, showing a rear end portion of the trailer.
Figure 7B:
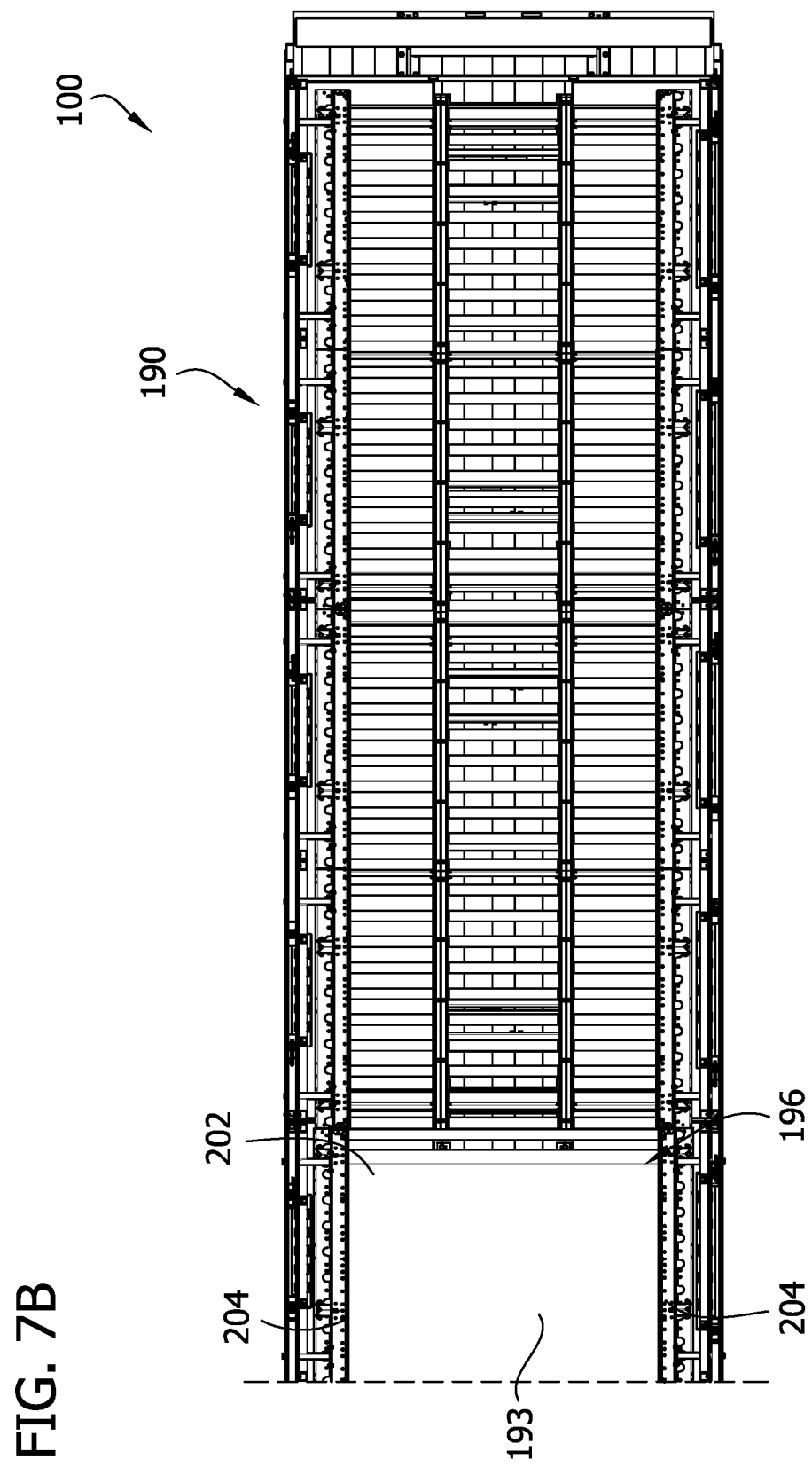
FIG. 7B is a fragment of a section taken in the plane including line 7-7 of FIG. 5, showing a front end portion of the trailer.
Figure 8:
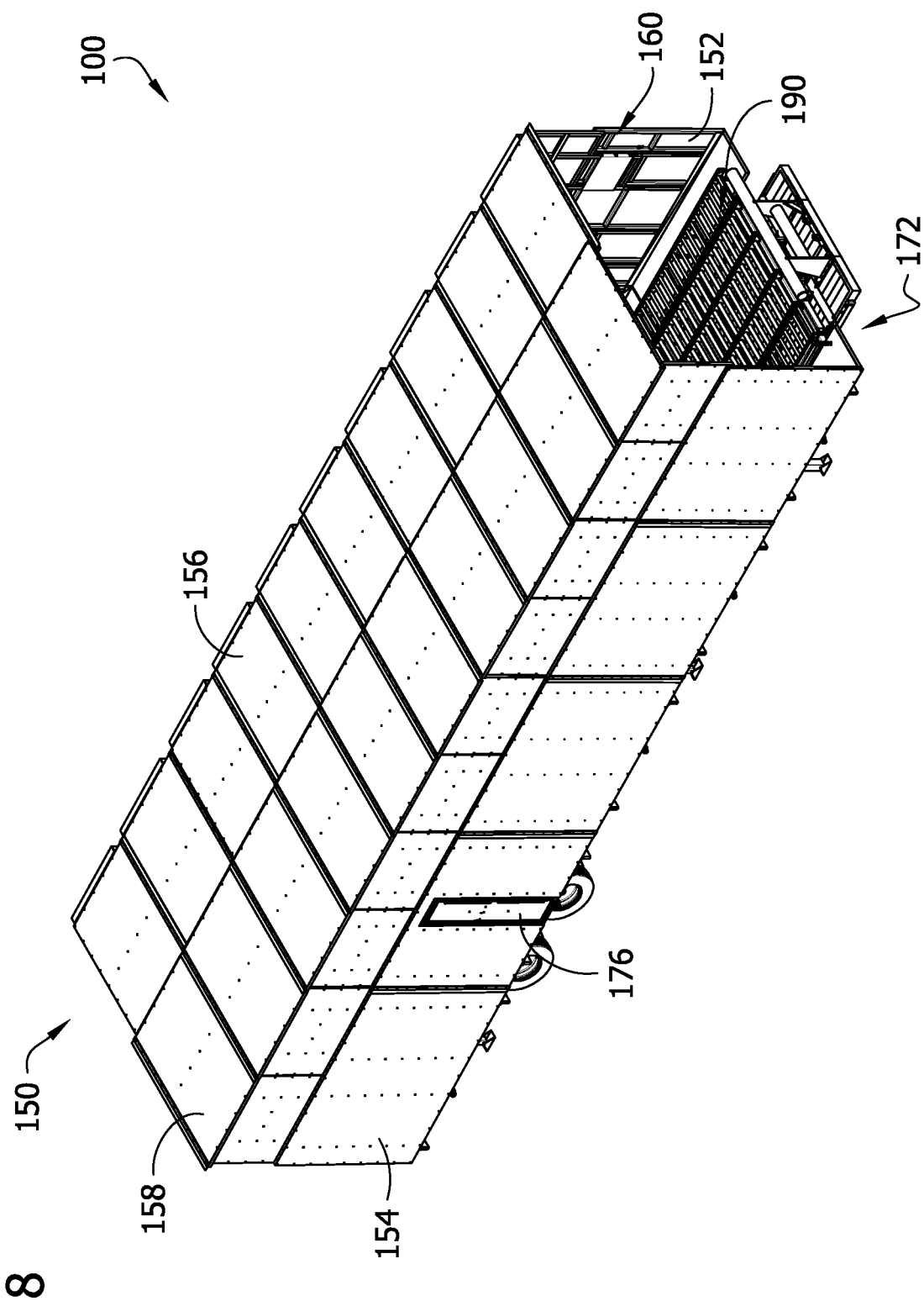
FIG. 8 is a perspective of the trailer of FIGS. 1-7B in its expanded configuration.
Figure 9:
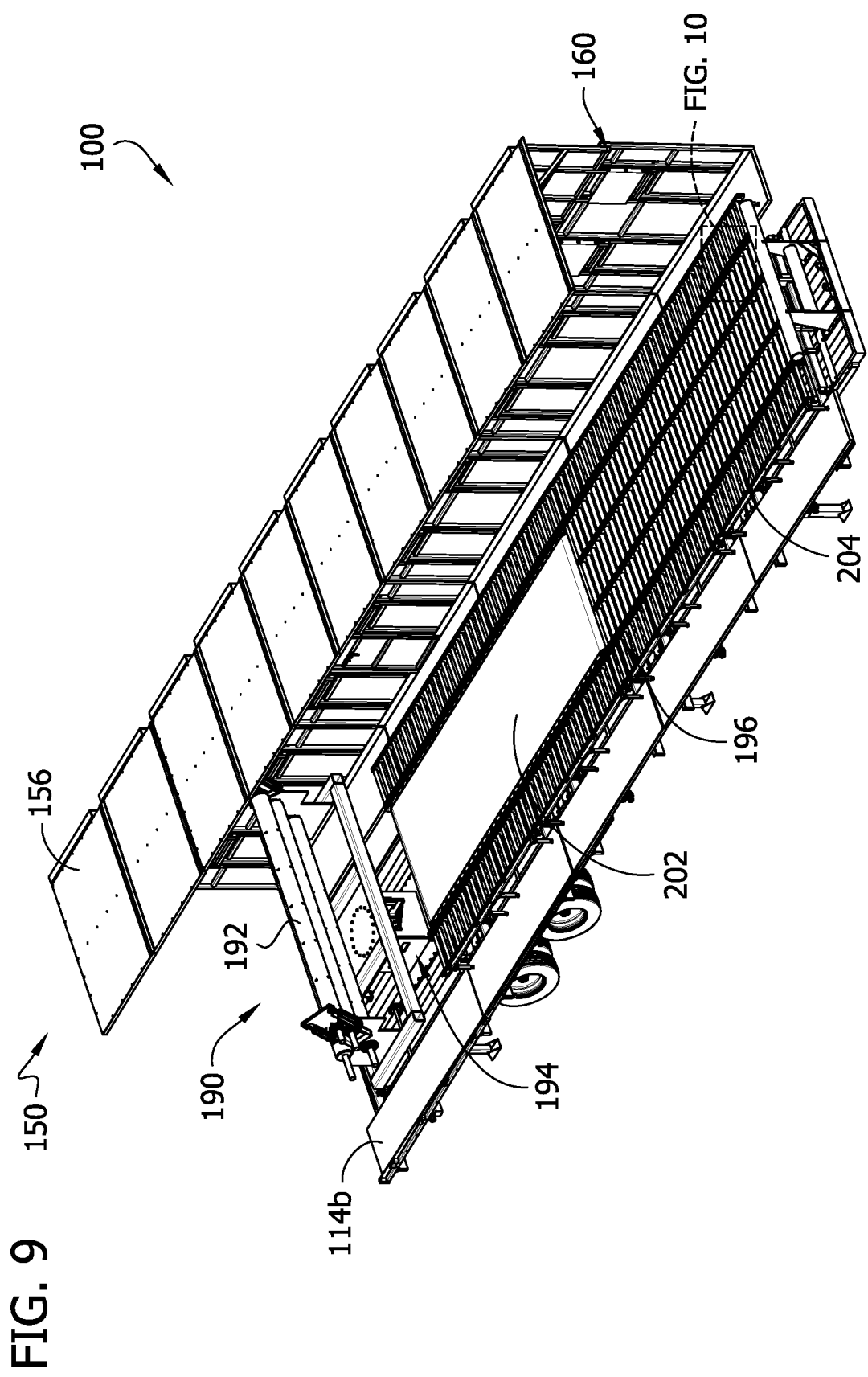
FIG. 9 is the perspective of FIG. 8, with a portion of the cover removed.
Figure 10:
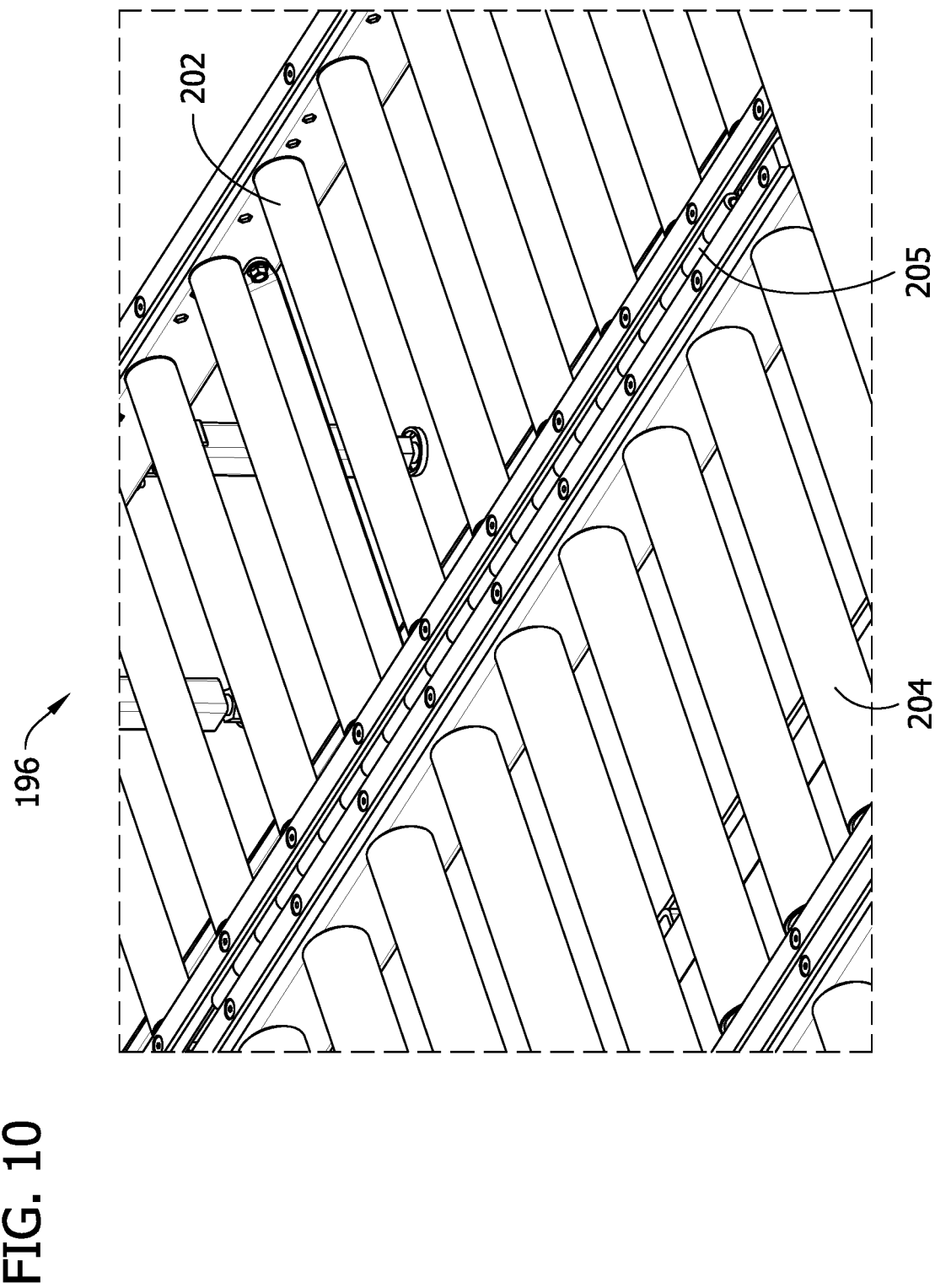
FIG. 10 is an enlarged, fragmentary view of a portion of FIG. 9.

Further, as seen in FIGS. 3-4 and 11-12, the bed 110, the side walls 152, 154, and the ceiling sections 156, 158 define a proximal portal 170 at the front end of the trailer 100 and a distal portal 172 at the back end of the trailer. The proximal and distal portals 170, 172 provide space for the loading and unloading of personnel, materials, equipment, and/or other objects through the front end and the back end, respectively. As is shown in FIG. 4, a barrier 180 can be secured over the distal portal 172 while the cover 150 is in the collapsed configuration, effectively closing off the back end of the trailer 100 for ease of transportation. It is contemplated that a similar closure can be secured over the proximal portal 170 for the same general effect on the front end of the trailer 100.

As is seen in FIGS. 13-14 and 35A-36B, the cover 150 includes a personnel portal 174 and a utility access portal 176, each located in a respective modified side wall 152a, 154a on a respective side of the trailer 100. It will be appreciated that the wall frame assemblies 160, which support the side walls 152a, 154a, are configured so they do not block the access portals 174, 176. The access portals 174, 176 provide additional access to the internal volume for personnel and for making connections through the cover 150. In the illustrated embodiment, the access portals 174, 176 are located near the location of a pinch press 192 within the trailer 100. The modified side walls 152a and 154a further include doors to cover the access portals 174, 176 when the access portals are not in use, though it is understood that alternative embodiments could use another type of closure or no closure at all for the access portals. Further, it is understood that the access portals 174, 176 are optional and that some alternative embodiments may include only one access portal or none at all.

As shown in FIGS. 28-34, each of the wall frame assemblies 160 includes a lower, static frame element 162, an upper, mobile frame element 164, a drive mechanism 166, and rails 168. Each static frame element 162 is configured to be secured upright to the floor 114 and to support a respective side wall 152, 154 in a static position. The mobile frame element 164 engages with the static frame element 162 via the drive mechanism 166 and rails 168, allowing the mobile frame element to travel vertically relative to the static frame element to accomplish the vertical expansion of the respective side wall 152, 154. Each mobile frame element 164 is also configured to support one of two respective ceiling sections 156 or 158 so that the respective ceiling sections travel vertically with the mobile frame element, allowing the ceiling section to be raised or lowered. The drive mechanism 166 and rails 168 define a finite vertical travel range VR that each wall mobile frame element 164 can travel. In the illustrated embodiment, it is contemplated that each wall frame assembly 160 has the same vertical travel range VR, though the range could vary in other embodiments. In the illustrated embodiment, the drive mechanism 166 includes five roller springs mounted on the mobile frame element 164. Free ends of the roller springs are operatively connected to the static frame element 162. As the mobile frame element 164 is down from its deployed position, the roller springs move with the mobile frame element and the roller springs unroll against their spring bias to exert a force on the mobile frame element 164, urging it to move up or deploy. The roller springs can apply a positive force to raise the mobile frame element 164, or simply serve as a counterbalance to reduce the effective weight of the mobile frame element, making it easier to move upwardly. The mobile frame element 164 and the corresponding roof section 156, 158 can be moved up manually or with motorized assistance. It will be understood that any other lifting mechanism generally known in the art may be used instead, such as an acme screw configuration as discussed above with respect to the floor 114. Likewise, a motor or another driving mechanism (or combination of mechanisms) can be used to assist or control the vertical travel of each wall frame 164, 166 in a generally known manner.

Figure 27:
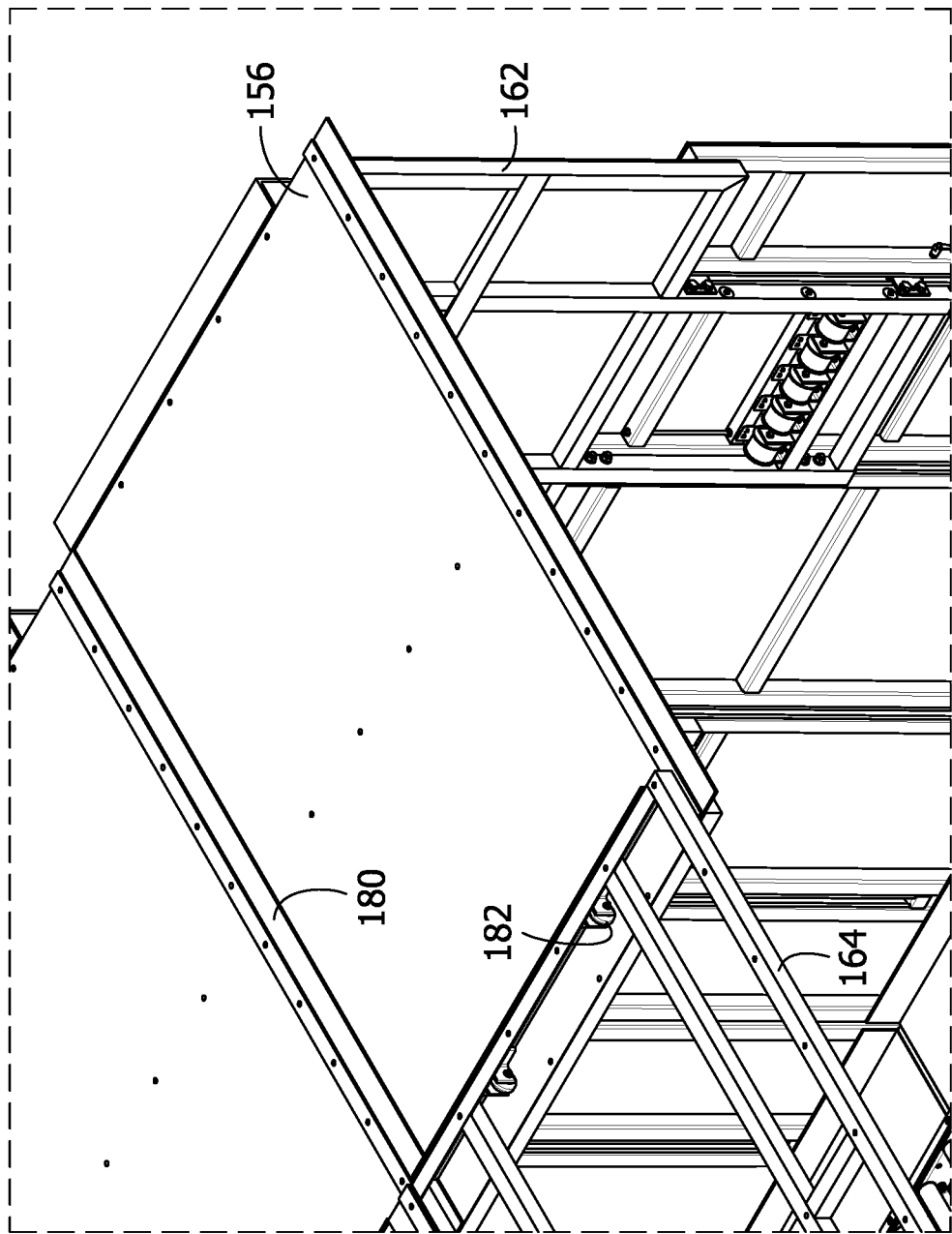
FIG. 27 is a fragmentary perspective of the cover of the trailer of FIG. 9, with a portion of a ceiling section removed.
Figure 31:
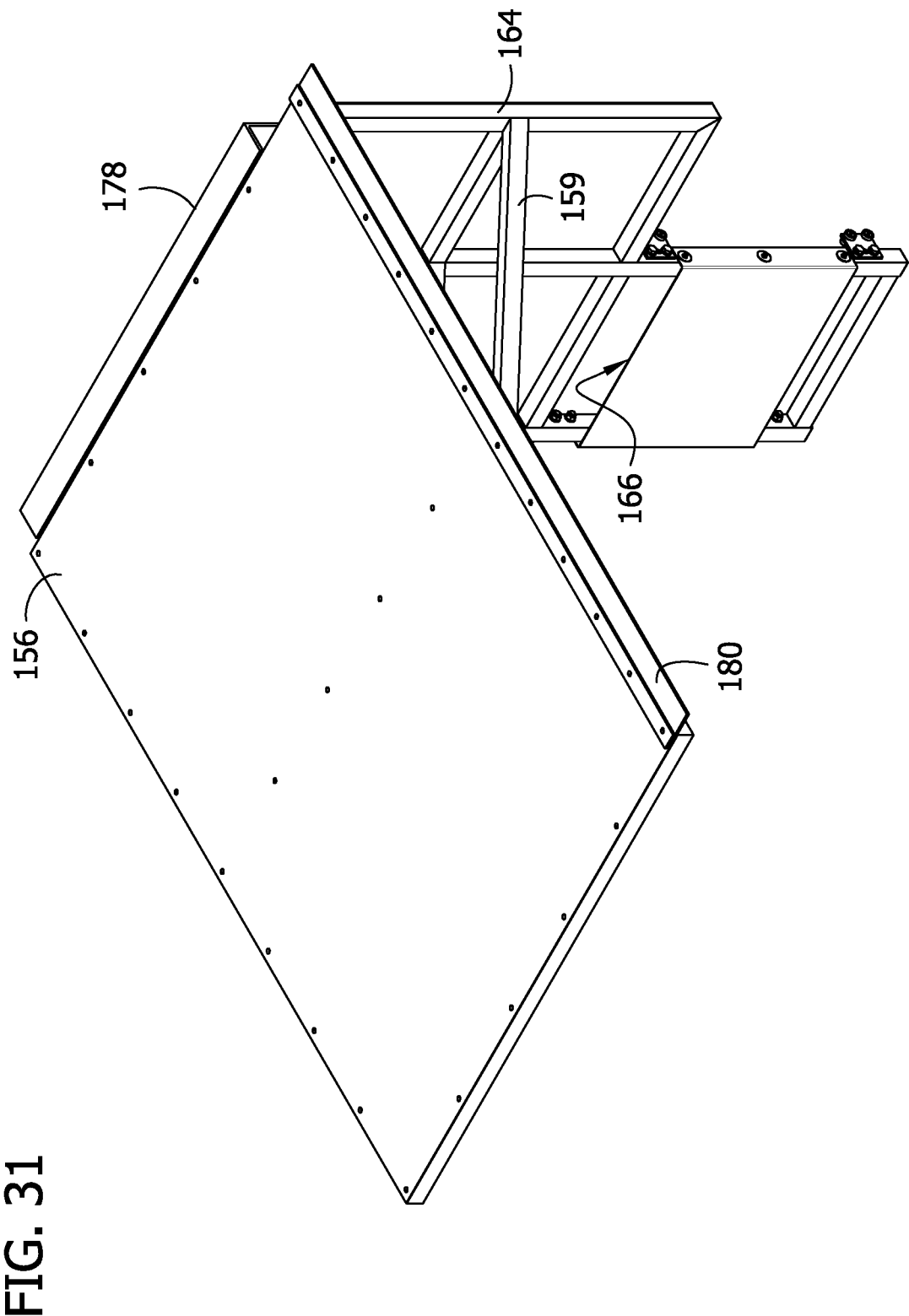
FIG. 31 is a perspective of a left ceiling section and a corresponding mobile frame element of the trailer of FIG. 1.
Figure 32:
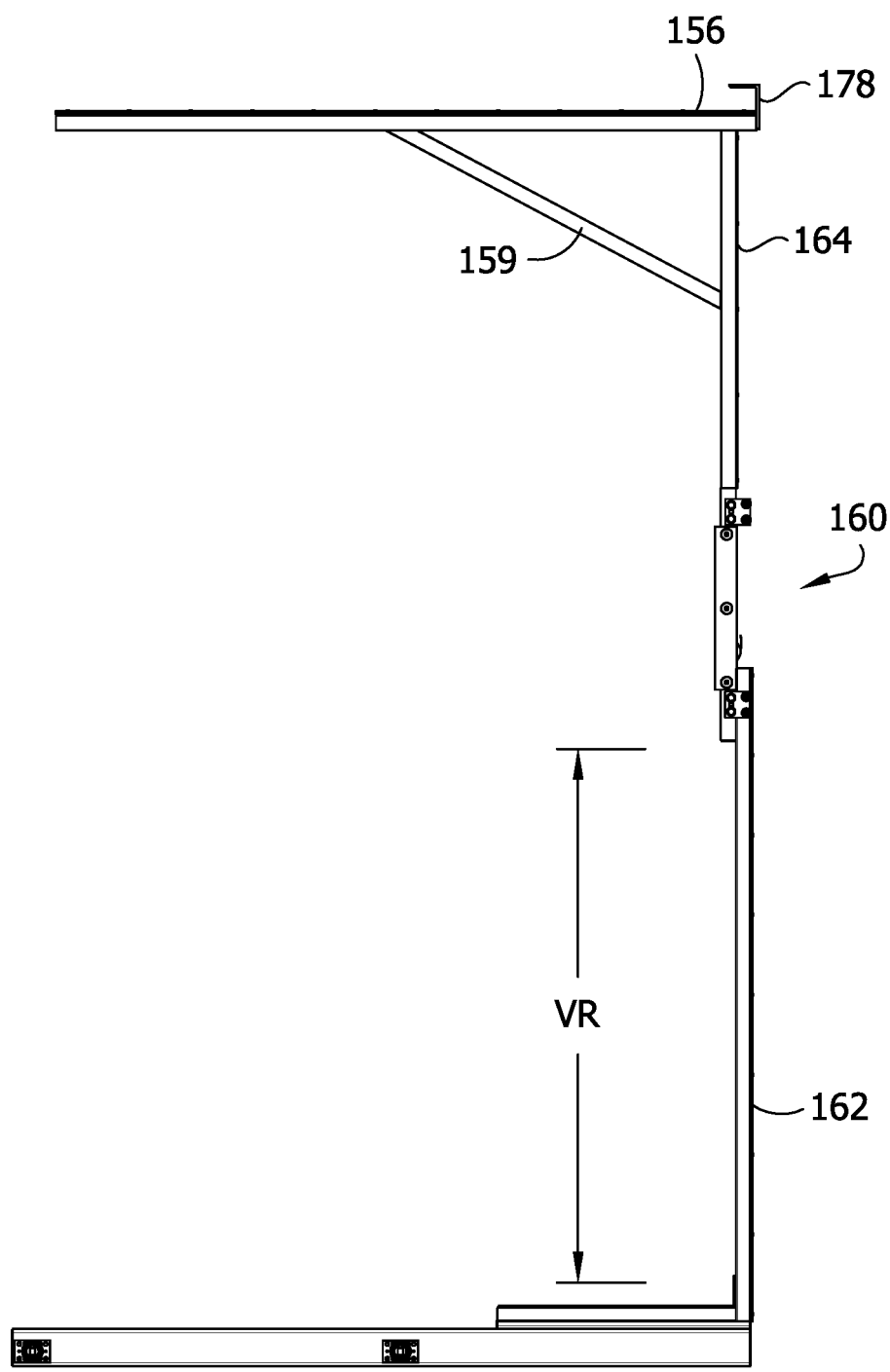
FIG. 32 is a schematic end view of the portion of the floor and cover.
Figure 33:
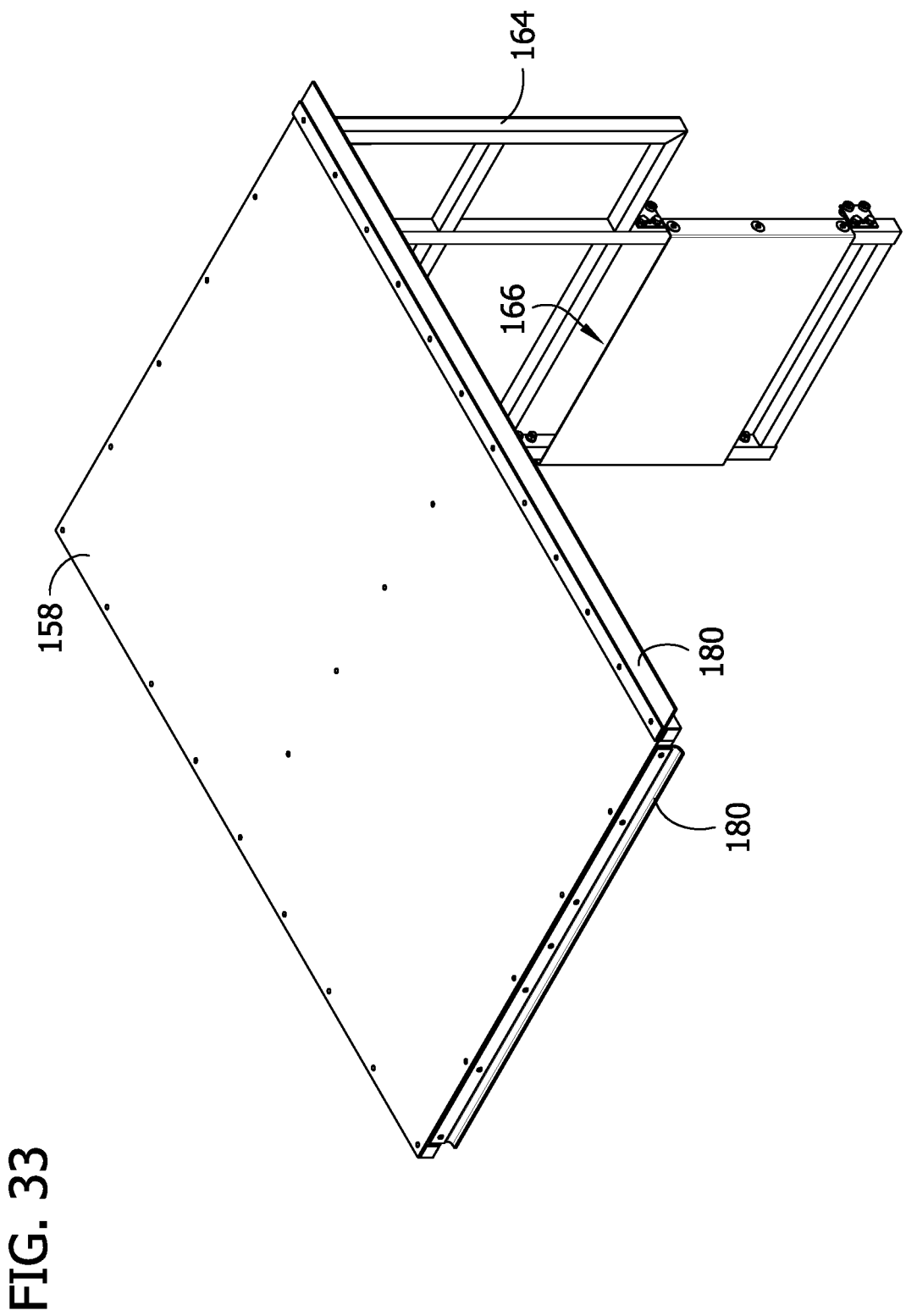
FIG. 33 is a perspective of a right ceiling section and a corresponding mobile frame element of the trailer of FIG. 1.

Each of the ceiling sections 156, 158 is configured not only for vertical expansion relative to a respective static frame element 162, but also for lateral expansion as the wall frames expand with respective floor sections 114a, 114b. As shown in FIGS. 31-34, the ceiling sections 156 and 158 are both generally L-shaped with a horizontal wall and a vertical wall. The respective horizontal walls of ceiling sections 156 and 158 are configured to overlap one over the other to define the roof of the cover 150. Thus, in the illustrated embodiment, each ceiling section 156 is configured to sit immediately beneath a corresponding ceiling section 158 and support some of the weight thereof. As shown in FIGS. 31-32, each of the mobile frame elements includes an angled brace 159 which provides additional support to carry the weight of the corresponding ceiling section 158. Further, each ceiling section 156 is configured to allow the corresponding ceiling section 158 to slide laterally as the trailer 100 expands and/or contracts laterally. As is shown in FIGS. 27 and 33, a roll wheel 182 can be used to facilitate the lateral sliding of ceiling section 158. In the illustrated embodiment, the horizontal walls of the ceiling sections 156, 158 are generally flat and remain in an overlapping relationship, ensuring that the cover 150 generally remains closed off not only to rain but also to sunlight—the latter of which is capable of causing the resins in a wetted-out CIPP lining to cure prematurely before the lining is properly installed in a host pipe. Further, each of the lower ceiling sections 156 has a raised end 178, which protrudes vertically from the vertex of its L-shaped angle. The raised end 178 captures and holds down a corresponding higher ceiling section 158. Thus, the raised end 178 provides additional stability for the ceiling sections 156, 158 when the trailer is being transported. Although the illustrated ceiling sections 156, 158 are generally flat and engage in an overlapping relationship, it will be understood that the ceiling sections of other embodiments can have different shapes and interactions without departing from the scope of the invention.

As is generally shown in FIGS. 27, 31, 33, and 35A-36B, the cover includes numerous flaps 180 which provide overlapping coverage between nearby components. For example, in FIG. 27, flaps 180 are configured to cover small gaps between adjacent ceiling sections 156. Likewise, in FIGS. 35A-36B, flaps 180 cover small gaps between side walls 152, 154 as well as the doors which cover the perimeters of personnel portal 174 and utility access portal 176. The flaps 180 provide additional protection from rain and sunlight where there may otherwise be small openings between the moving parts of cover 150.

Figure 18:
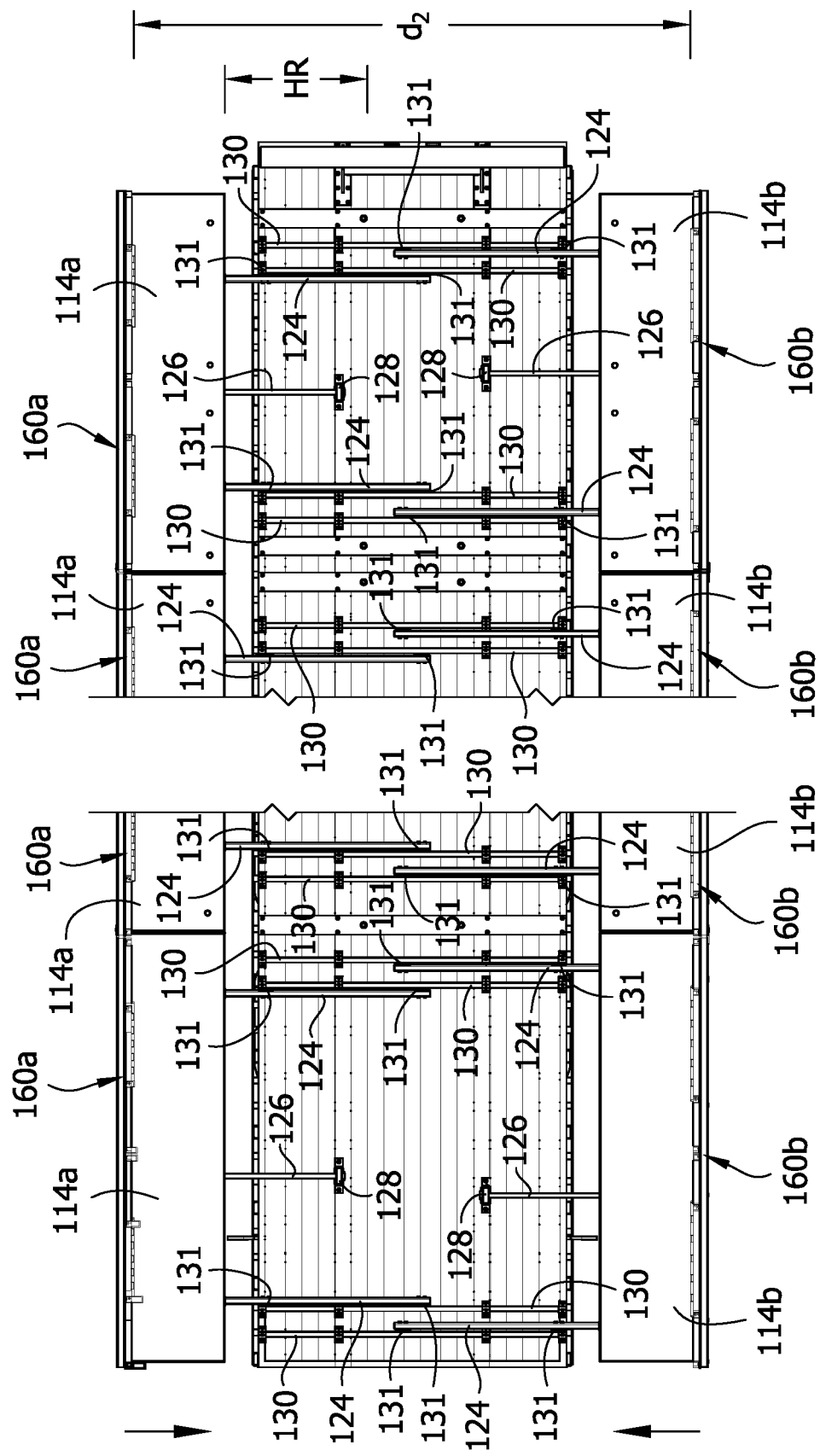
FIG. 18 is the section of FIGS. 16 and 17, with the staging system of the trailer removed, and the trailer in its expanded configuration.
Figure 19:
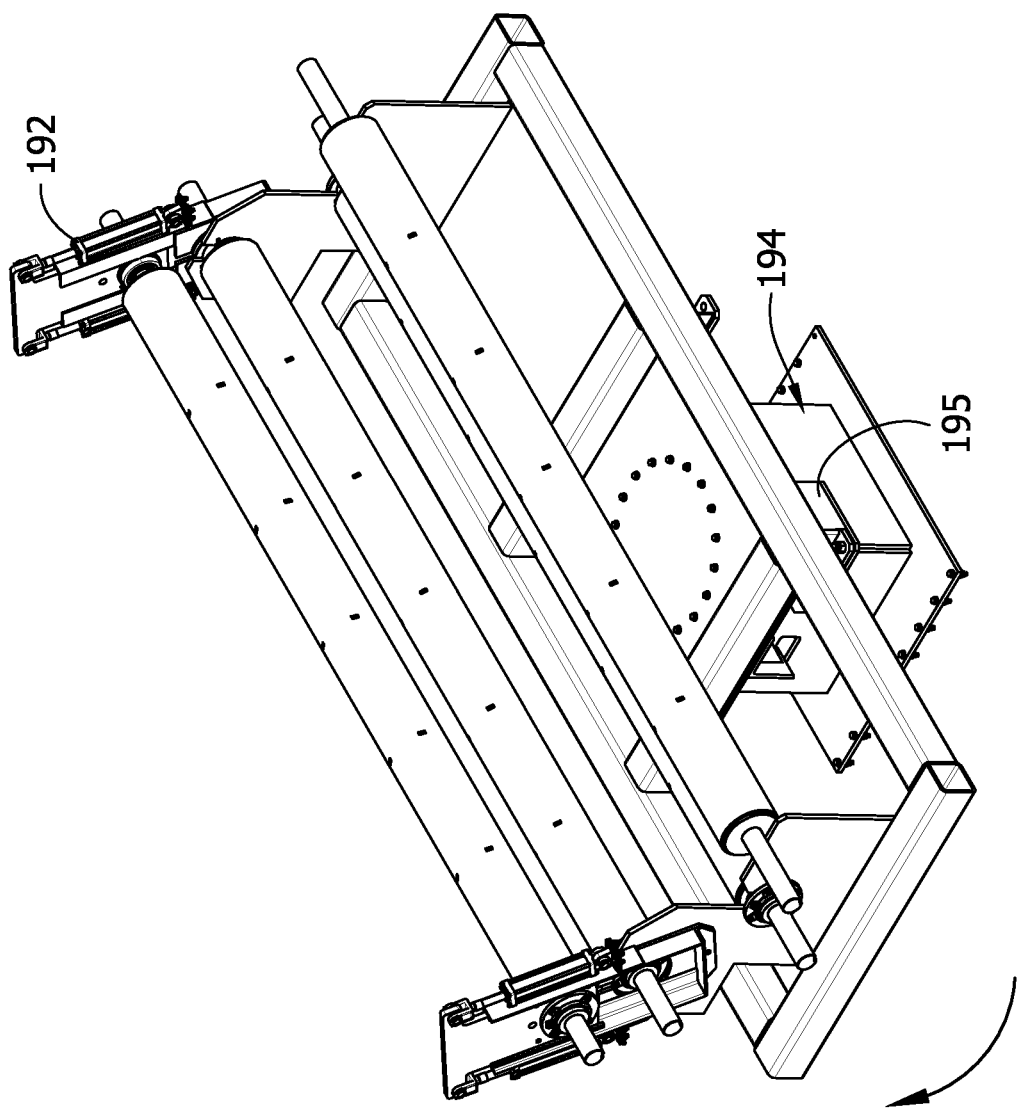
FIG. 19 is a perspective of the pinch press and turntable assembly of the trailer of FIGS. 1-16, the pinch press being in its in-line orientation.
Figure 20:
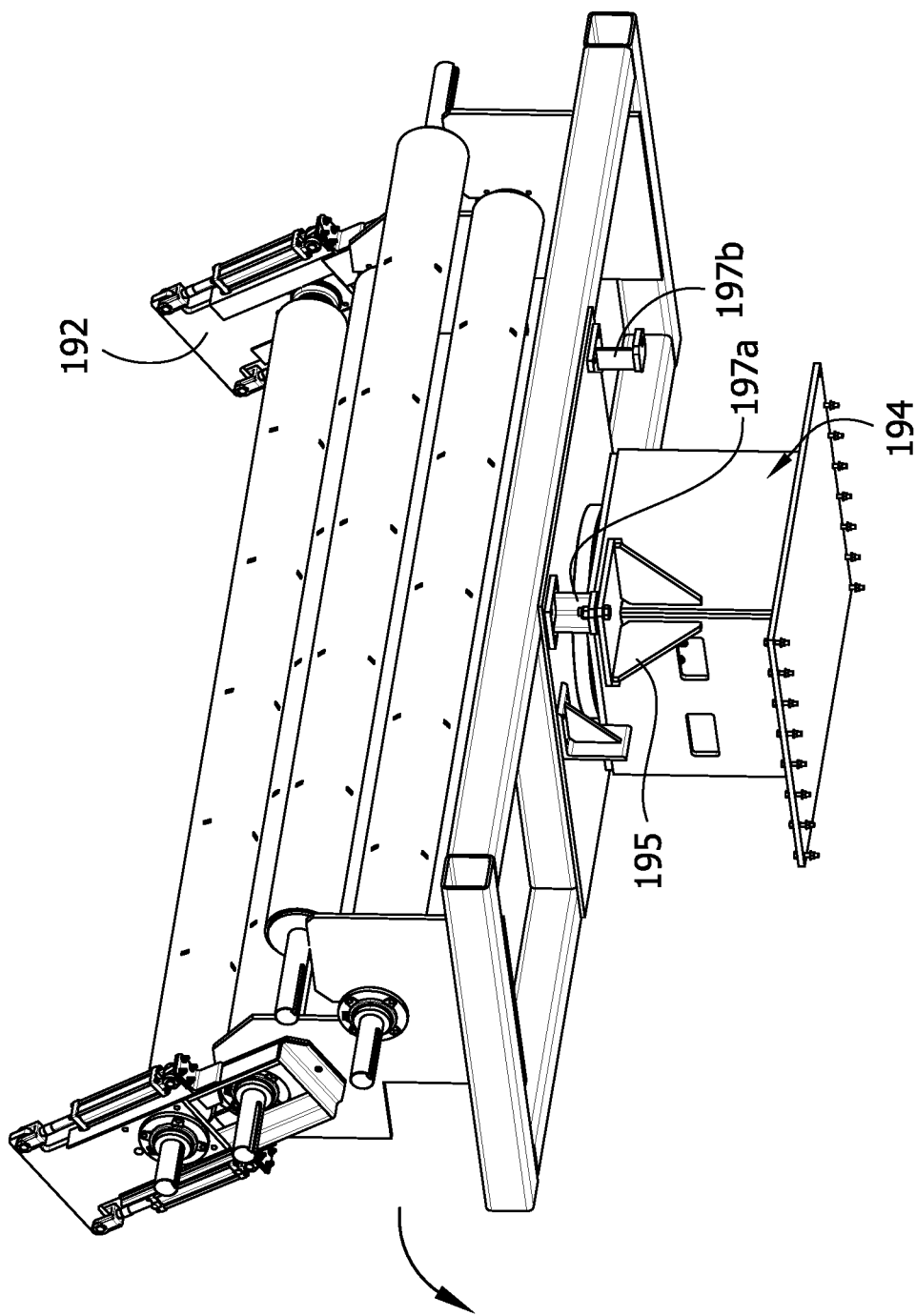
FIG. 20 is a bottom side perspective thereof.
Figure 21:
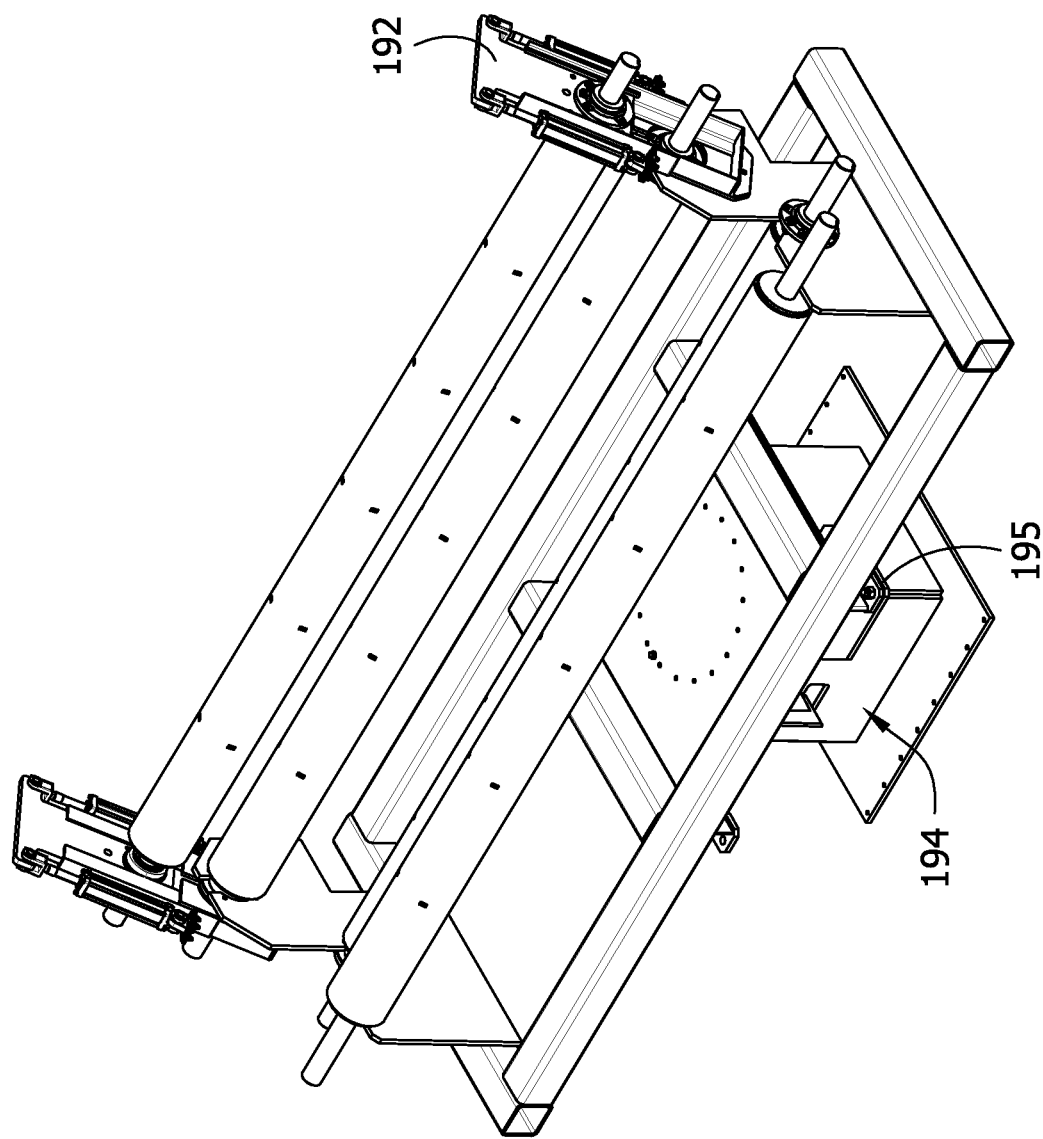
FIG. 21 is a perspective of the pinch press and turntable assembly of FIGS. 19-20, the pinch press being in its compact orientation.
Figure 22:
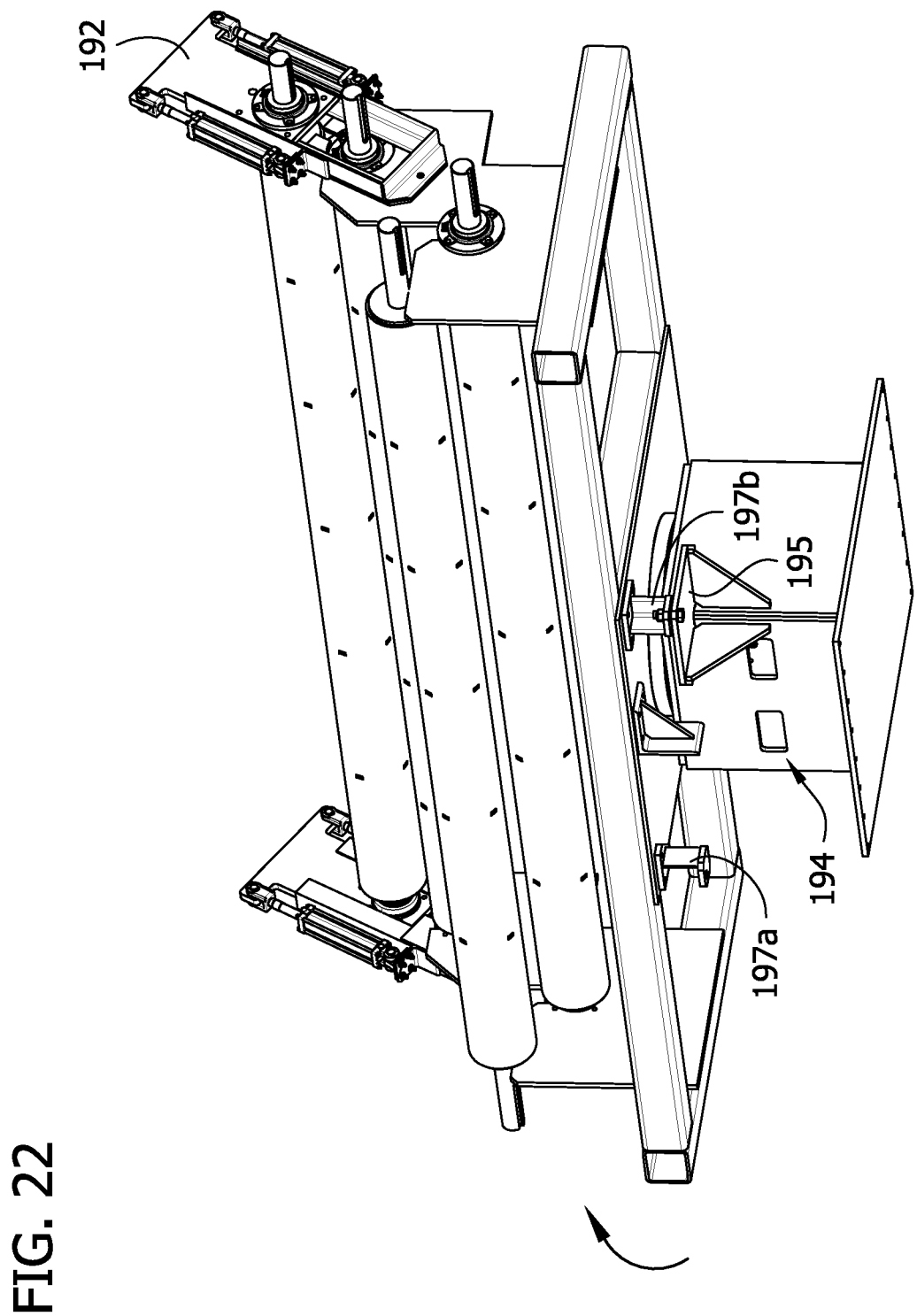
FIG. 22 is a bottom side perspective thereof.

In the illustrated embodiment as generally shown in FIGS. 17-18, the cover 150 includes five wall frame assemblies 160a along a first longitudinal side of the trailer 100 and an additional five wall frame assemblies 160b along the other longitudinal side of the trailer. Each wall frame assembly 160a or 160b is securely mounted to a corresponding floor section 114a, 114b. Each of the wall frame assemblies 160a on the right side of the trailer 100 supports a single side wall 152 and two ceiling sections 156 arranged side-by-side. Similarly, on the left side of the trailer, each of the wall frame assemblies 160b supports a single side wall 154 and two ceiling sections 158 arranged side-by-side. It will be understood that other embodiments may include a different number or arrangement of wall frames, side walls, and/or ceiling sections. In the illustrated embodiment, when the trailer 100 is in the collapsed position, the collapsed distance $d_1$ between each parallel pair of wall frame assemblies 160a, 160b measures about 95 inches. This width generally corresponds to the standard width of a trailer bed. When the trailer 100 is in an expanded position, the expanded distance $d_2$ between each symmetrical pair of wall frames 164, 166 measures about 181 inches, and accordingly the horizontal travel range HR of each section of the floor 114 is about 43 inches. It is contemplated that the distance $d_2$ can vary from approximately 96 inches to 200 inches depending on the size of the trailer and the components of the staging system 190 discussed in greater detail below.

Figure 11:
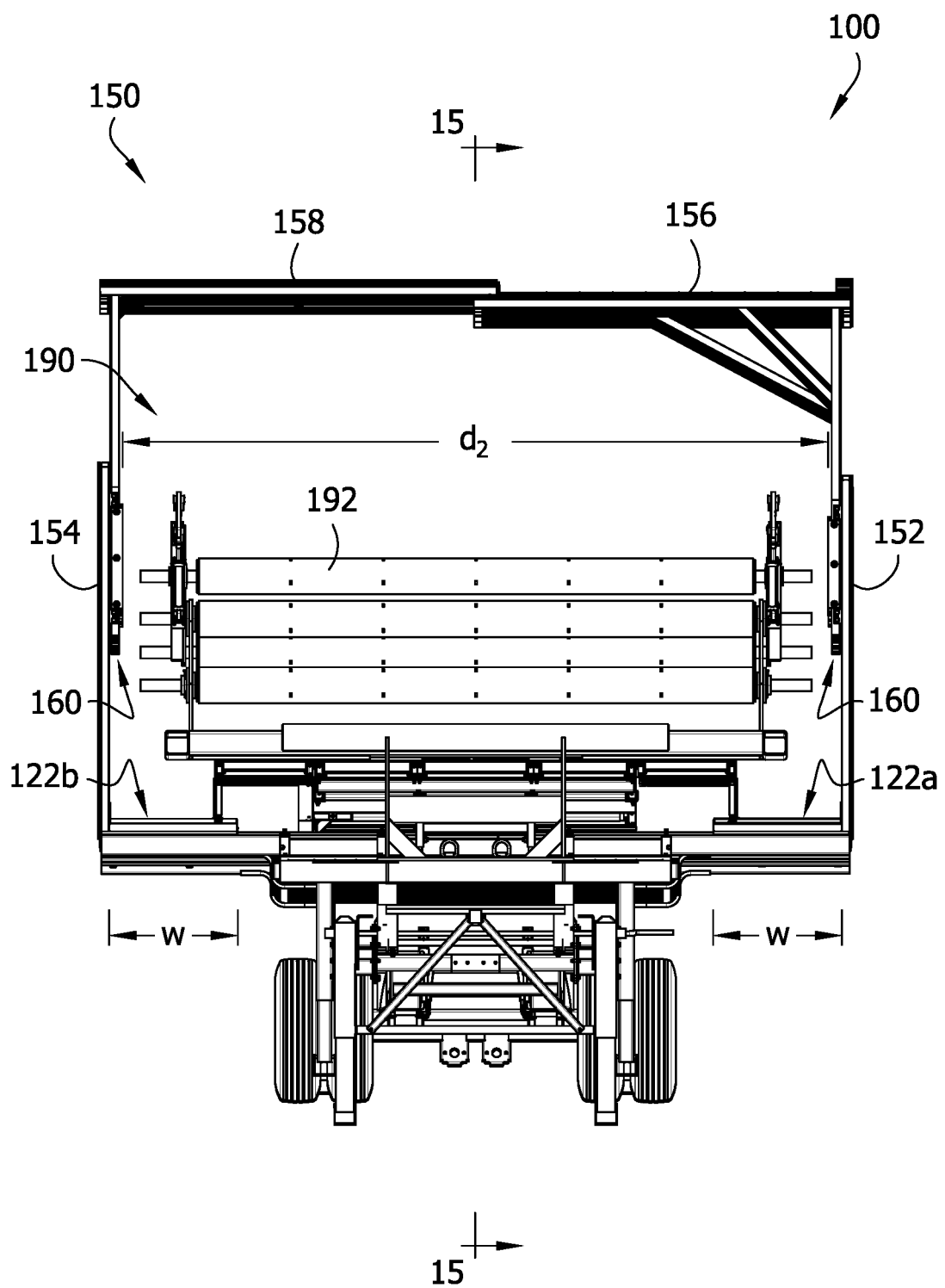
FIG. 11 is a front elevation of the expanded trailer of FIG. 9.
Figure 12:
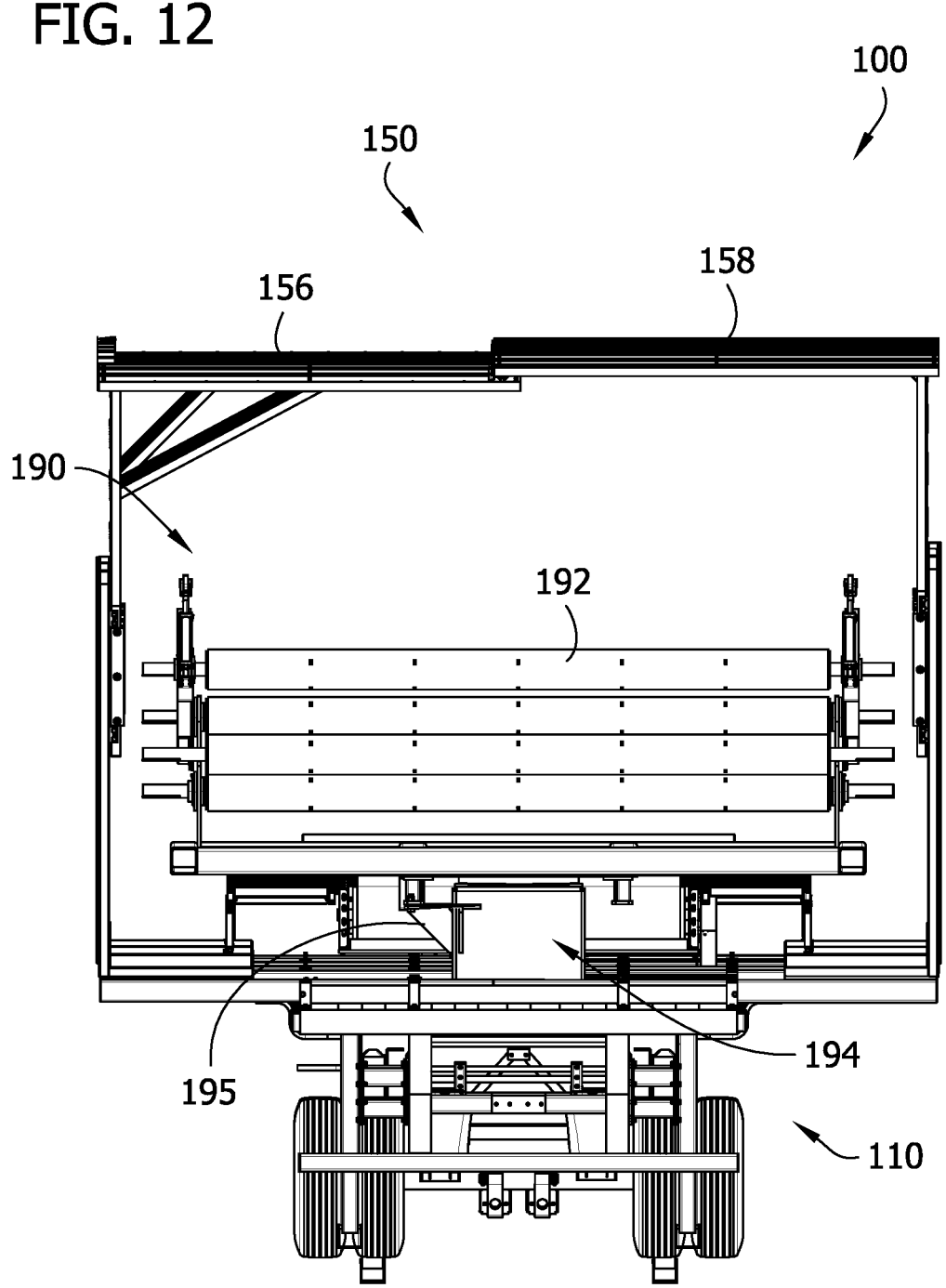
FIG. 12 is a rear elevation thereof.

Additionally, as shown in FIGS. 11, 17-18, the surfaces of the floor sections 114a, 114b on either side of the bed 110 have a width w of approximately 30-35 inches. About 25 inches of the floor sections 114a, 114b are disposed between the bed 110 and the walls, providing a suitable amount of space for workers and materials to move within the internal volume of the trailer 100 when the trailer is in the expanded position and is being used on-site for pipe installation. It is understood that the width w is substantially less than half the width of the bed 110, ensuring that the components of the staging system 190 can be secured to the chassis 112 near the center of trailer 100 without interfering with the floor 114 when the trailer is in its collapsed position, as explained in further detail below.

Referring to FIGS. 6A-7B, the staging system 190 includes a pinch press 192 which is mounted on a turntable assembly 194, a conveyor assembly 196, a resin delivery system (not shown), and a vacuum (not shown). In some embodiments, two vacuum pumps are mounted on the underside of the trailer 100 and plumbed for providing vacuum pressure for use in wetting out liners. In some embodiments, a resin delivery system is separate from the trailer. As indicated above, the pinch press 192 is mounted on the turntable assembly 194 near the back end of the trailer 100 and is located above the axles 116 which are positioned beneath the chassis 112. The pinch press 192 is located relatively high in the internal volume of the trailer 100 and leaves space for the other components of the staging system 190 to be positioned closer to the level of the floor 114. The conveyor assembly 196 is generally positioned between the pinch press 192 and the front end of the trailer and thus spans a majority of the length of the trailer 100. Additionally, the conveyor assembly 196 is positioned a short distance above the floor 114 of the bed 110.

One of the advantages of staging system 190 is that its components (i.e., the pinch press 192, the conveyor assembly 196, the resin delivery system, and the vacuum) are partially installed on the trailer 100 and therefore can remain connected to electrical wires and fluid conduits on the trailer indefinitely for faster setup and take-down. The staging system 190 further includes an electrical terminal (not shown) located near the utility access portal 176. The electrical terminal is configured to connect electrically with the pinch press 192, the resin delivery system, the vacuum, and other electrically powered equipment on the trailer, such as motors for driving the lateral or vertical expansion of the trailer 100 as previously discussed. It will be understood that the electrical terminal could connect to different components in other embodiments. Thus, the electrical terminal greatly simplifies the process of connecting the various components to an external generator and/or disconnecting the components therefrom by providing one electrical terminal which can power most or all of the equipment on the trailer 100 from a single connection. This allows the remaining components to stay at least partially wired while the trailer 100 is in the collapsed position. Similarly, the staging system 190 includes a fluid conduit terminal located near the utility access portal 176. As with the electrical terminal, the fluid conduit terminal is configured to connect with the resin delivery system and the vacuum within the trailer 100 and facilitates external connections with a resin mixer and a vacuum pump remote from the trailer, thus simplifying the connection/disconnection process during setup and take-down. As with the electrical terminal, the fluid conduit terminal allows the resin delivery system and the vacuum to remain partially connected with inlet/outlet conduits while the trailer is in the collapsed position. In other embodiments, it is contemplated that the electrical terminal and the fluid conduit terminal could be in other locations of the trailer 100 and/or could be included in an integral terminal unit. In yet other embodiments, a trailer may not have an electrical terminal or a fluid conduit terminal, or either.

Figure 23:
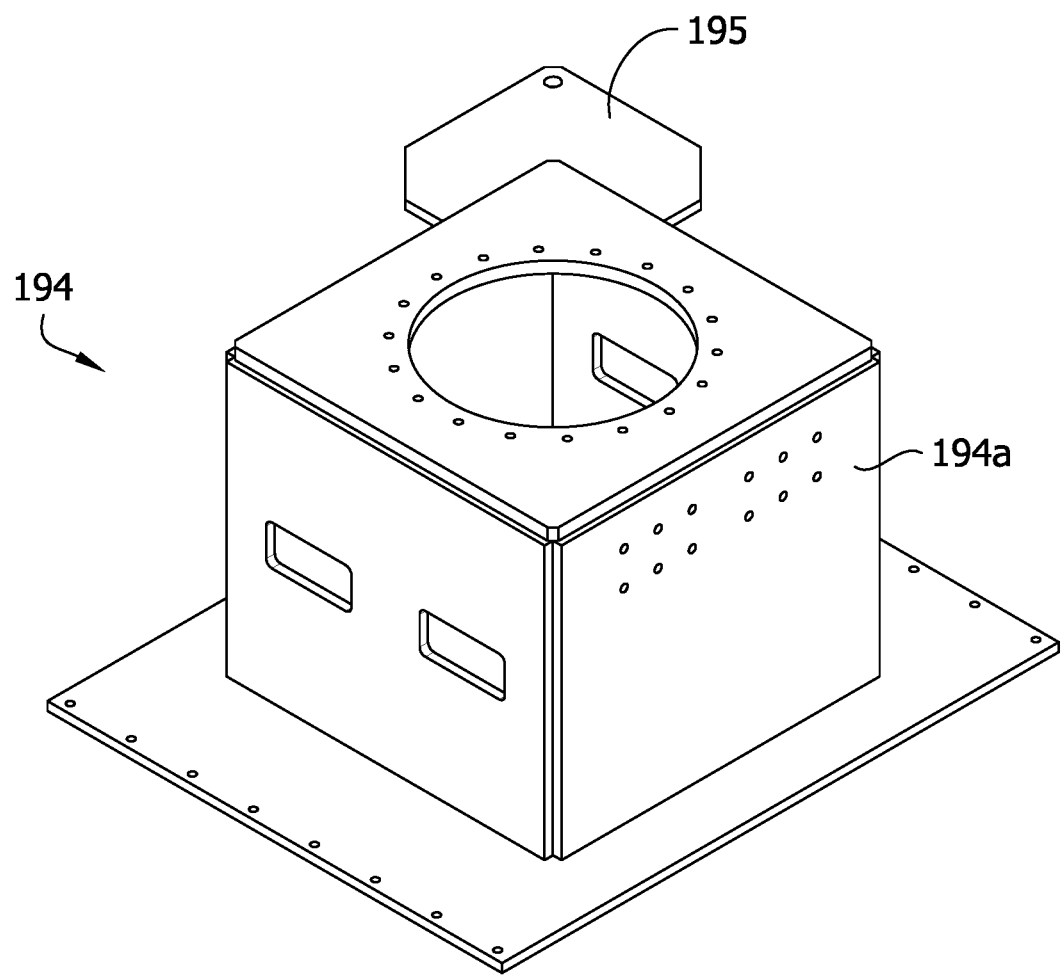
FIG. 23 is a perspective of the turntable assembly of FIGS. 19-22.

Referring to FIGS. 9-12, 15-16, and 19-22, the pinch press 192 is powered by a hydraulic motor (not shown), which is installed on the trailer 100 and connected to the pinch press. In some embodiments, the hydraulic motor (or "power pack") is mounted under the trailer 100. The pinch press 192 is configured to pull lining for pipes that have a diameter of up to 96", so it will be appreciated that the pinch press is wider than the collapsed distance $d_1$ of the trailer 100 as described above (FIGS. 3, 17). Thus, in the illustrated embodiment, the frame of the pinch press 192 is mounted on the turntable assembly 194, which allows the pinch press to pivot between an in-line position (FIGS. 19-20) during at least pipe installation stages and a compact position (FIGS. 20-21) during transportation and other idle stages. In the illustrated embodiment, the in-line position is generally parallel to the back end of the trailer 100, allowing the pinch press 192 to occupy most of the expanded distance $d_2$ between side wall frame assemblies 160 when the trailer is expanded. The stowed position is generally perpendicular to the back end of the trailer 100, allowing the pinch press 192 to fit within the collapsed distance $d_1$ between collapsed side wall frames 164, 166. As shown in FIGS. 19-22, the pinch press 192 is mounted centrally on the turntable assembly 194. This configuration allows a single operator to be able to rotate the pinch press 192 between the two positions with minimal effort. Alternatively, it is contemplated that a motor or another machine can power the turntable assembly 194 so the pinch press 192 can be moved between positions. In the illustrated embodiment the turntable assembly can be locked to the bolt plate 195 using a bolt. As can be seen in FIG. 23, the bolt plate can be welded or otherwise secured to the turntable base 194a. It is contemplated that the pinch press 192 can be thus bolted via respective locking flanges 197a, 197b when the pinch press is in either the in-line position or the stowed (compact) position. Further, it is understood that other securing mechanisms can be used to the same effect in other embodiments.

Referring to FIGS. 6A-7B, 9-10, and 15-16, the conveyor assembly 196 includes a central conveyor 202 and two side conveyors 204, one on each side of the central conveyor. The conveyors 202, 204 extend over a significant portion of the trailer 100 generally between the location of the pinch press 192 and the front end of the trailer. The central conveyor 202 has supports connected directly to the chassis 112, while the side conveyors 204 have foldable supports that allow the side conveyors to rest on the floor 114 when the trailer 100 is in the expanded position. As shown in FIG. 16, the central conveyor is relatively broad and includes a front region 206 located closer to the front end of the trailer and a wet-out region 208 detail below, are located closer to the pinch press 192. In the illustrated embodiment, the front section 206 has conventional tube rollers while the wet-out section 208 has a powered conveyor configured to transport pipe lining when the staging system 190 is in use. The side conveyors 204 are substantially more compact than the central conveyor 202 and, as will be described in greater configured to be folded into a generally vertical position above the central conveyor 202 when the trailer 100 is in the collapsed position and unfolded into a horizontal position adjacent and generally level with the central conveyor when the trailer is in the expanded position. In the illustrated embodiment, the side conveyors 204 have conventional tube rollers across their entire span and include foldable supports which engage with the floor 114 when the side conveyors are in their horizontal configuration. Because the side conveyors 204 are generally level with the central conveyor 202 when in the expanded position, the entire conveyor assembly 196 functions as a single unit for transporting pipe lining during use. It is understood that conveyors used in other embodiments may vary from the conveyors 202, 204 of the illustrated embodiment without departing from the scope of the invention. As a non-limiting example, an alternative central conveyor could use tube rollers or a belt conveyor exclusively.

As shown in FIGS. 6A-7B, 9-10, and 16, the side conveyors 204 are connected to the sides of the central conveyor 202 with piano hinges 205. The hinges allow the side conveyors 204 to pivot between a generally vertical position and a horizontal position as described above. The pivoting interaction between the side conveyors 204 and the central conveyor 202 allows the conveyor assembly 196 to be arranged in a collapsed position (FIGS. 6A-7B) or an expanded position (shown FIGS. 9-10, 16) as the trailer is prepared for transportation and/or pipe installation, respectively. In other embodiments, it is contemplated that one or more side conveyors 204 may be removably installed adjacent the central conveyor without the use of a hinge in a manner that allows for simple installation and dismantling with the other elements of the trailer 100.

It is understood that the lateral span of the collapsed conveyor assembly 196 will not exceed the collapsed distance $d_1$ between collapsed side wall frames 164, 166. On the other hand, the lateral span of the expanded conveyor assembly 196 can exceed the collapsed distance $d_1$. Of course, as is shown in FIG. 16, the lateral span of the expanded conveyor assembly 196 must be less than the expanded distance $d_2$ between expanded side wall frames 164, 166, not only for the conveyor assembly to fit inside the internal volume of the trailer 100 but also so that a substantial amount of the floor surfaces remains exposed so workers and/or supplies have enough space to travel through the trailer on either side.

In use, the trailer 100 is arranged in its collapsed position and hitched to a truck for transportation to and from a pipe installation site. As is shown in FIGS. 6A-7B, the turntable assembly 194 and pinch press 192, the conveyor assembly 196, the floor 114, and the cover 150 are moved to their respective collapsed configurations as described above, the jacks 120 are retracted, and any electrical and/or fluid conduits externally connected to the trailer 100 are disconnected and removed from the utility access portal 176. As discussed above, the chassis 112 is configured to be hitched to a truck near the front end of the trailer 100. When collapsed, the trailer 100 has a relatively compact lateral and vertical profile with dimensions generally resembling the dimensions of an ordinary semi-trailer. Thus, the collapsed trailer 100 is compliant for navigating roadways with ordinary truck clearances. For example, in one embodiment, the trailer 100 in its collapsed state can be about 48 feet long about 8.5 feet wide.

When the trailer 100 is at a pipe installation site, the trailer is positioned so its back end generally faces the location of a host pipe for installation access. Then, the jacks 120 are extended to reach the ground surface beneath the trailer 100, and the truck is separated from the trailer so the trailer is fully supported by the wheels 118 and jacks 120. The trailer 100 is then converted to its expanded position by laterally expanding the floor 114 and the side walls 152, 154; elevating the ceiling sections 156, 158; unlocking and rotating the turntable assembly 194 so the pinch press 192 is converted from its stowed position to its in-line position; and unfolding the side conveyors 204 and the supports of the side conveyors so the side conveyors rest horizontally adjacent the central conveyor 202. The trailer 100 can be converted from its collapsed position to its expanded position in five hours or less, thus demanding significantly less time and labor than a more conventional process of unloading the oversized equipment from the trailer, constructing a covered work site on the ground near the host pipe, and connecting all of the equipment inside the work site.

Additional equipment is brought to the site of the host pipe for placement near the trailer 100. The equipment can include without limitation an electrical generator, a resin mixer, a vacuum pump, an installation device to be positioned directly above the host pipe, a curing device, and a storage unit for dry lining. The foregoing equipment, and other components which could be used with the trailer 100, are generally known in the art and are not shown in the Figures. As indicated above, the trailer 100 is configured to be positioned with its back end generally adjacent the site of the host pipe. This placement of the back end allows wetted-out lining to be fed out from the pinch press 190 and distal portal 172 and directly to the on-site installation device for being laid into an existing pipe. The travel distance from the trailer to the installation device is short, and the lining is suspended at a relatively high elevation due to the substantial height of the bed 110 off the ground. This nearby, elevated positioning of the lining reduces the risk of complications arising from exposing the lining to excessive sunlight, rain, or debris. After the truck has been separated from the trailer 100 as described above, the storage unit for dry lining can similarly be placed near the front end of the trailer. This positioning allows lining to be fed directly from the storage unit, through the front opening, and onto the conveyor assembly 196, simplifying and accelerating the staging processes occurring in the trailer 100. The remaining equipment is arranged on-site as needed to simplify and accelerate the staging, installation, and curing of the CIPP lining. External electrical and/or fluid conduits are connected to their respective equipment (e.g., the electrical generator, the resin mixer, the vacuum pump) through the utility access portal 176 or another suitable opening for fast installation.

After pipe installation has finished, it is contemplated that the trailer 100 and additional components are dismantled, and the trailer is converted to its collapsed position. In general, the dismantling and converting process occurs in the opposite order of the setup process discussed above. Thus, the trailer 100 can be converted to its collapsed form—and therefore be ready for transportation—in a matter of hours.

It is understood that alternative embodiments of the invention may include some of the above-described features but not others. Further, in some embodiments, the trailer may be configured to expand asymmetrically or unilaterally. In other embodiments, the pinch press may be narrower and therefore not require a turntable assembly to fit within the trailer in its collapsed position. The above variations should be understood as illustrative examples and not as an exhaustive list.

Additionally, it is understood that alternative embodiments of the invention may use different parts to accomplish the same functions described above. For example, in some embodiments, the cover may have an expandable tarp rather than side walls and ceiling sections. In other embodiments, the cover may have a sloped or rounded roof. In yet other embodiments, the side conveyors may be removable rather than foldable.

Having described the invention in detail, it will be apparent that modifications and variations are possible without departing from the scope of the invention defined in the appended claims.

When introducing elements of the present invention or the preferred embodiments(s) thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the invention are achieved and other advantageous results attained.

As various changes could be made in the above products without departing from the scope of the invention, it is intended that all matter contained in the above description and shown in the accompanying drawings shall be interpreted as illustrative and not in a limiting sense.

The invention claimed is:

1. A trailer for staging a pipe lining for in-place installation and curing, the trailer comprising:
    a horizontal bed extending from a front end of the trailer to a back end of the trailer, the bed including a chassis and an expandable floor, and the floor being slidably coupled to an upper surface of the chassis;
    an expandable cover coupled to the bed, the cover comprising a roof and a plurality of side walls, the cover extending from approximately the front end of the trailer to approximately the back end of the trailer to define an internal volume of the trailer, each of the plurality of side walls being coupled to a respective portion of the bed, at least one of the side walls being coupled to the floor, and the roof being coupled to the plurality of side walls; and
    a staging apparatus located within the internal volume, the staging apparatus comprising a conveyance system and a pinch press, the conveyance system and the pinch press being sized and shaped to receive the pipe lining for staging, the conveyance system having a collapsed configuration and an expanded configuration, the conveyance system being configured to be converted between the collapsed configuration and the expanded configuration, the conveyance system having a first width when in its collapsed configuration and a second width greater than the first width when in its expanded configuration;
    wherein the floor is configured to expand laterally outward from the chassis, defining a first internal width of the trailer when the floor is in a retracted position relative to the chassis and defining a second internal width of the trailer when the floor is in an expanded position relative to the chassis;
    wherein the second internal width is greater than the width of the chassis;
    wherein the first width of the conveyance system is less than or equal to the first internal width of the trailer;
    wherein the floor, when in the expanded position, defines at least one floor surface spanning at least a distance between a first one of the side walls coupled to the floor and an outermost side of the conveyance system closest to said first one of the side walls when the conveyance system is in the expanded configuration; and
    wherein the roof is configured to expand laterally with the floor and the at least one of the side walls coupled to the floor.

2. The trailer as claimed in claim 1, the floor comprising a first floor section and a second floor section, wherein the first and second floor sections are coupled to the chassis on opposite sides of the bed, wherein the first one of the side walls is coupled to the first floor section and a second one of the side walls is coupled to the second floor section such that the first floor section and the first side wall expand laterally outward in a first direction relative to the chassis, and the second floor section and the second side wall expand laterally outward in an opposite direction relative to the chassis, and wherein the first floor section defines a first floor surface and the second floor section defines a second floor surface.

3. The trailer as claimed in claim 1, the cover being further configured to expand vertically.

4. The trailer as claimed in claim 3, the cover comprising at least one vertical expansion mechanism configured to vertically expand the plurality of side walls and elevate the roof.

5. The trailer as claimed in claim 4, the roof comprising at least a first ceiling section on a first side of the trailer and at least a second ceiling section on a second side of the trailer opposite the first side, the first ceiling section being configured to support the second ceiling section.

6. The trailer as claimed in claim 5, the at least one vertical expansion mechanism comprising a plurality of vertical expansion mechanisms, the roof comprising a plurality of first ceiling sections and a plurality of second ceiling sections, wherein each of the ceiling sections is coupled to a discrete one of the vertical expansion mechanisms.

7. The trailer as claimed in claim 4, wherein the at least one vertical expansion mechanism comprises an acme screw.

8. The trailer as claimed in claim 1, the bed further comprising at least one horizontal expansion mechanism configured to cause the floor and the at least one of the side walls to travel between the retracted position and the expanded position.

9. The trailer as claimed in claim 8, wherein the at least one horizontal mechanism comprises an acme screw.

10. The trailer as claimed in claim 1, wherein the pinch press is configured to be oriented in a first position substantially parallel to the back end of the trailer when the staging apparatus is in use.

11. The trailer as claimed in claim 10, wherein the pinch press is configured to be oriented in a second position that is not substantially parallel to the back end of the trailer when the staging apparatus is not in use.

12. The trailer as claimed in claim 11, wherein in the first position the pinch press has a width that is greater than the first width of the trailer and less than the second width of the trailer.

13. The trailer as claimed in claim 11, the trailer comprising a turntable assembly with a pivot axis configured for mounting the pinch press, the pinch press being configured to rotate about the pivot axis between the first position and the second position.

14. The trailer as claimed in claim 1, wherein the staging apparatus is configured to perform the steps of:
    impregnating the pipe lining with a resin using a resin delivery system;
    distributing the resin in the impregnated pipe using a vacuum;
    staging the impregnated pipe for installation on the conveyance system; and
    feeding the staged pipe lining from the conveyance system through the pinch press for installation and curing outside the trailer.

15. The trailer as claimed in claim 1, the trailer comprising electrical and fluid connections for the staging apparatus and at least one outlet for said electrical and fluid connections, the at least one outlet being configured to facilitate connectivity with electrical and fluid sources remote from the trailer.

16. The trailer as claimed in claim 15, wherein the at least one outlet constitutes at least one access portal located in the cover.

17. The trailer as claimed in claim 1, the conveyance system comprising a first conveyor.

18. The trailer as claimed in claim 17, the conveyance system further comprising at least one second conveyor, the first conveyor being coupled to the bed near a center of the bed and extending from a first end near the front end of the trailer to a second end near the pinch press; and the at least one second conveyor being pivotally coupled to a side of the first conveyor such that the at least one second conveyor can be positioned horizontally adjacent and parallel to the first conveyor when the conveyance system is in its expanded configuration and can be positioned at an angle relative to the first conveyor when the conveyance system is in its collapsed configuration.

19. The trailer as claimed in claim 17, the conveyance system further comprising at least one removable second conveyor;
wherein the first conveyor is coupled to the bed near a center of the bed and extends from a first end near the front end of the trailer to a second end near the pinch press; and
wherein the at least one removable second roller conveyor is configured to be removably coupled to a side of the first roller conveyor such that the at least one second roller conveyor can be positioned horizontally adjacent the first roller conveyor when the conveyor system is in its expanded configuration and can be detached from the first roller conveyor when the conveyance system is in its collapsed configuration.

20. The trailer as claimed in claim 1, the trailer further comprising a plurality of axles coupled to the chassis on a bottom side of the chassis and extending substantially across a width of the chassis.

21. The trailer as claimed in claim 20, wherein the axles are positioned near the pinch press.

22. A trailer for staging a pipe lining for in-place installation and curing, the trailer comprising:
a horizontal bed extending from a front end of the trailer to a back end of the trailer, the bed including a chassis and an expandable floor, and the floor being slidably coupled to an upper surface of the chassis;
a cover coupled to the bed, the cover comprising a plurality of side walls, the cover extending from approximately the front end of the trailer to approximately the back end of the trailer to define an internal volume of the trailer, each of the plurality of side walls being coupled to a respective portion of the bed, and at least one of the side walls being coupled to the floor of the bed;
a staging apparatus located within the internal volume, the staging apparatus comprising a conveyance system and a pinch press, the conveyance system and the pinch press being sized and shaped to receive the pipe lining for staging;
electrical and fluid connections for the staging apparatus; and
at least one outlet for said electrical and fluid connections, the at least one outlet being located in the cover and configured to facilitate connectivity with electrical and fluid sources remote from the trailer;
wherein the floor is configured to expand laterally outward from the chassis, defining a first internal width of the trailer when the floor is in a retracted position relative to the chassis and defining a second internal width of the trailer when the floor is in an expanded position relative to the chassis;
wherein the second internal width is greater than the width of the chassis;
wherein the conveyance system has a collapsed configuration in which the conveyance system has a width that is less than or equal to the first internal width;
wherein the floor, when in the expanded position, defines at least one floor surface spanning at least a portion of the distance between one of the side walls coupled to the floor and an outermost side of the conveyance system closest to said first one of the side walls.

* * * * *